(12) United States Patent  (10) Patent No.: US 11,128,183 B2
Okamoto et al.  (45) Date of Patent: Sep. 21, 2021

(54) ELECTRIC POWER TRANSMISSION DEVICE

(71) Applicant: PANASONIC CORPORATION, Osaka (JP)

(72) Inventors: Katsuya Okamoto, Fukuoka (JP); Souichi Kawata, Fukuoka (JP); Kazuhiro Eguchi, Fukuoka (JP); Yoshio Koyanagi, Kanagawa (JP); Ryosuke Hasaba, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/754,640

(22) PCT Filed: Feb. 8, 2019

(86) PCT No.: PCT/JP2019/004756
§ 371 (c)(1),
(2) Date: Apr. 8, 2020

(87) PCT Pub. No.: WO2019/187708
PCT Pub. Date: Oct. 3, 2019

(65) Prior Publication Data
US 2020/0321810 A1 Oct. 8, 2020

(30) Foreign Application Priority Data

Mar. 27, 2018 (JP) ............................. JP2018-060900
Mar. 27, 2018 (JP) ............................. JP2018-060901

(51) Int. Cl.
H02J 50/80 (2016.01)
H02J 50/12 (2016.01)
(Continued)

(52) U.S. Cl.
CPC .............. *H02J 50/80* (2016.02); *B63H 21/17* (2013.01); *H02J 50/12* (2016.02); *H02J 50/40* (2016.02)

(58) Field of Classification Search
CPC .. H02J 50/10; H02J 50/12; H02J 50/40; H02J 50/50; H02J 50/60; H02J 50/70;
(Continued)

(56) References Cited

U.S. PATENT DOCUMENTS

2005/0057422 A1 3/2005 Deguchi et al.
2014/0232200 A1 8/2014 Maekawa

FOREIGN PATENT DOCUMENTS

JP 10-223057 8/1998
JP 2005-102101 4/2005
(Continued)

OTHER PUBLICATIONS

International Search Report (ISR) from International Searching Authority (Japan Patent Office) in International Pat. Appl. No. PCT/JP2019/004756, dated Apr. 9, 2019.

*Primary Examiner* — John W Poos
(74) *Attorney, Agent, or Firm* — Greenblum & Bernstein, P.L.C.

(57) ABSTRACT

An electric power transmission device transmits electric power to an electric power reception device including an electric power reception coil in water. The electric power transmission device includes one or more transmission coils which include an electric power transmission coil configured to transmit electric power to the electric power reception coil via a magnetic field, an electric power transmitter, configured to transmit AC power to the electric power transmission coil, a capacitor which is connected to the transmission coil and forms a resonance circuit which resonates with the transmission coil, a first tubular member which is waterproof and seals a periphery of the transmission coil, a second (Continued)

tubular member which surrounds the first tubular member and includes a plurality of holes, and an adjuster, configured to adjust an amount of air in a gap between the first tubular member and the second tubular member.

14 Claims, 12 Drawing Sheets

(51) Int. Cl.
*H02J 50/40* (2016.01)
*B63H 21/17* (2006.01)

(58) Field of Classification Search
CPC .. H02J 50/80; H02J 50/90; H02J 7/025; H02J 50/005; H02J 2310/48; H01F 38/14; H01F 27/234; H01F 27/327; H04B 5/0037; H04B 5/0081; B60L 53/12; B60L 53/122; B60L 53/30; B60L 53/38; B60L 53/126; B60L 53/36; B60L 53/65
USPC .......................................................... 307/104
See application file for complete search history.

(56) References Cited

FOREIGN PATENT DOCUMENTS

| JP | 2015-015901 | | 1/2015 | |
|----|----|----|----|----|
| JP | 2017028832 | * | 2/2017 | .............. H02J 50/00 |
| JP | 2018-007354 | | 1/2018 | |

* cited by examiner

ELECTRIC POWER TRANSMISSION DEVICE

TECHNICAL FIELD

The present disclosure relates to an electric power transmission device that wirelessly transmits electric power in water.

BACKGROUND ART

It is known that an underwater base station, serving as an electric power transmission device, transmits electric power to an underwater vehicle, serving as an electric power reception device, in a non-contact manner using a magnetic resonance method (see, for example, Patent Literature 1). The electric power transmission device includes an electric power transmission resonance coil, a balloon, and a balloon control mechanism. The electric power transmission resonance coil transmits electric power to an electric power reception resonance coil of the electric power reception device in the non-contact manner by the magnetic field resonance method. The balloon contains the electric power transmission resonance coil therein. The balloon control mechanism expands the balloon during electric power transmission, thereby discharging water between the electric power transmission resonance coil and the electric power reception resonance coil.

An antenna device is known, which transmits electric power and data to an IC-mounted medium by using an electromagnetic induction method using a 13.56 MHz frequency band (see, for example, Patent Literature 2). It is disclosed that the antenna device includes at least one electric-power-supplied loop antenna, which is supplied with a signal current, and at least one non-electric-power-supplied loop antenna, which is not supplied with the signal current, a signal current is also generated in the non-electric-power-supplied loop antenna through using a magnetic field generated by the electric-power-supplied loop antenna, thereby enlarging a communication range of the electric-power-supplied loop antenna.

CITATION LIST

Patent Literature

Patent Literature 1: JP-A-2015-015901
Patent Literature 2: JP-A-2005-102101

SUMMARY OF INVENTION

Technical Problem

The present disclosure relates to an electric power transmission device that transmits electric power wirelessly in water, and provides an electric power transmission device capable of easily changing an arrangement position, in a water depth direction, of a coil configured to transmit electric power in water.

Solution to Problem

A first aspect of the present disclosure is an electric power transmission device which is configured to transmit electric power to an electric power reception device including an electric power reception coil in water. The electric power transmission device includes: one or more transmission coils which include an electric power transmission coil configured to transmit the electric power to the electric power reception coil via a magnetic field; an electric power transmitter, configured to transmit AC power to the electric power transmission coil; a capacitor which is connected to the transmission coil and forms a resonance circuit which resonates with the transmission coil; a first tubular member which is waterproof and seals a periphery of the transmission coil; a second tubular member which surrounds the first tubular member and includes a plurality of holes; and an adjuster, configured to adjust an amount of air in a gap between the first tubular member and the second tubular member.

A second aspect of the present disclosure is an electric power transmission device which is configured to transmit electric power to an electric power reception device including an electric power reception coil in water. The electric power transmission device includes: one or more transmission coils which include an electric power transmission coil configured to transmit electric power to the electric power reception coil via a magnetic field; an electric power transmitter, configured to transmit AC power to the electric power transmission coil; a capacitor which is connected to the transmission coil and forms a resonance circuit which resonates with the transmission coil; a tubular member which is waterproof and seals a periphery of the transmission coil; an accommodating body which is connected to the tubular member and accommodates air; and an adjuster, configured to adjust an amount of air accommodated in the accommodating body.

Advantageous Effects of Invention

According to the present disclosure, the electric power transmission device can easily change the arrangement position, in the water depth direction, of the coil configured to transmit electric power in water.

DESCRIPTION OF EMBODIMENTS

An electric power transmission device is assumed to communicate with an electric power reception device in close proximity. In order to transmit electric power by a magnetic resonance method without bringing the electric power transmission device and the electric power reception device close to each other in water, it is necessary to install at least one coil at a predetermined position in water. In this case, when a frequency used for electric power transmission of the magnetic resonance method is relatively low, it is necessary to increase a diameter of the coil. When the diameter of the coil is large, the coil becomes heavy, and easily sinks in a water bottom direction.

In order to install the coil in water, a support column or rope is necessary for fixing the coil to a desired position. However, when specific gravity of the coil is larger than specific gravity of water or sea water, it is necessary to increase strength of the support column or the rope. For this reason, a construction cost for installing the coil and a material cost of the coil are increased. If the coil is heavy, it is necessary to increase a size of a ship for transporting the coil, thus a transportation cost for transporting the coil is also increased.

If it is desired to use the electric power transmission device at a deep place in water, it may be necessary to make the coil firm and it may be difficult to install the coil at a desired deep position in water only by considering a weight of the coil. Therefore, in order to install the coil at the desired position in a water depth direction, it is preferable that the coil is capable of being freely floated or submerged.

Hereinafter, embodiments will be described in detail with reference to the drawings. However, unnecessarily detailed descriptions may be omitted. For example, a detailed description of a well-known matter or a repeated description of substantially the same configuration may be omitted. This means to avoid unnecessary redundancy in the following description and to facilitate understanding of those skilled in the art. The accompanying drawings and the following description are provided for those skilled in the art to facilitate thorough understanding of the present disclosure, and are not intended to limit the claimed subject matters.

First Embodiment

Figure 1:
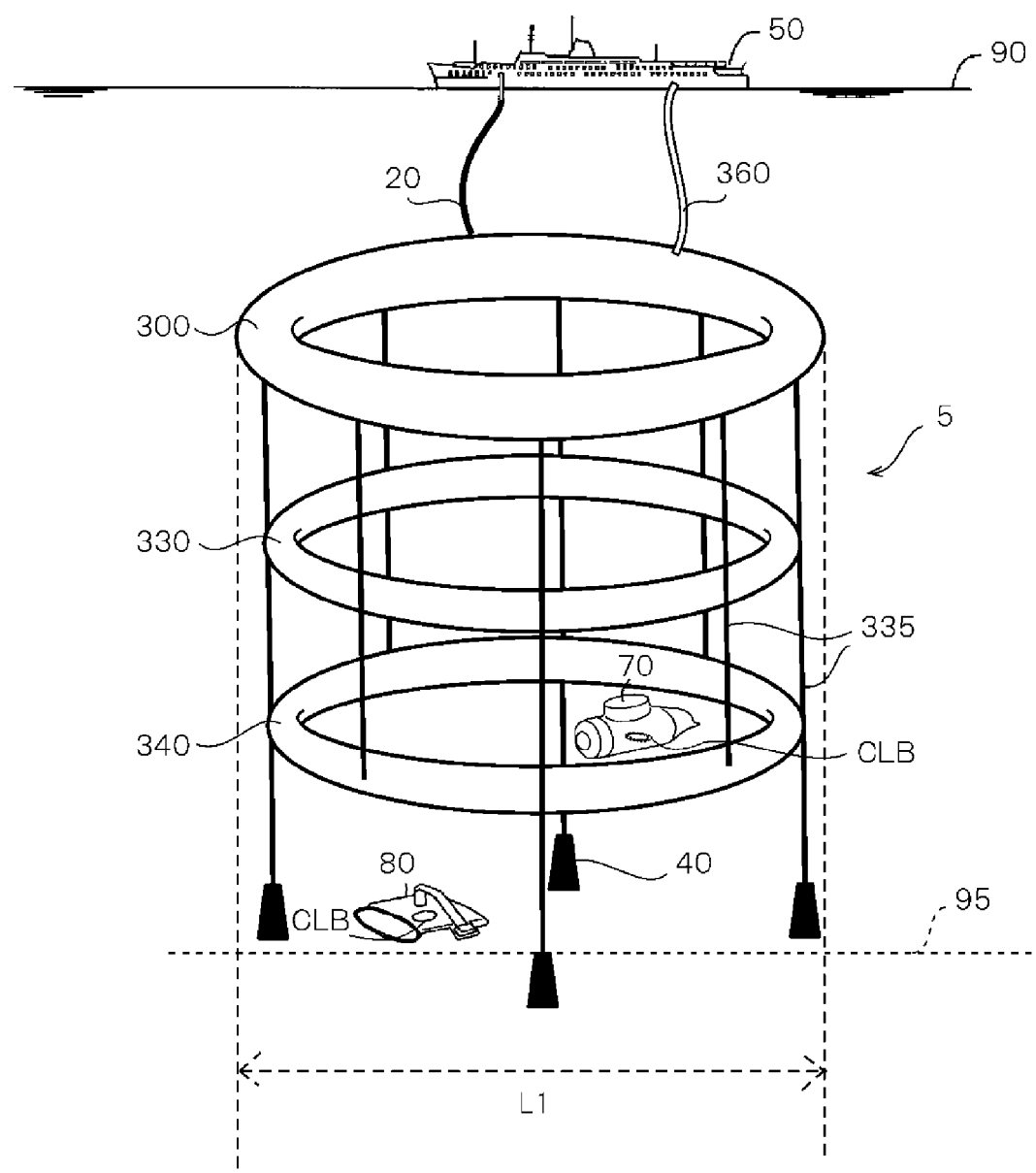
FIG. 1 is a schematic diagram showing an example of an environment in which an electric power transmission system according to a first embodiment is placed.
Figure 2:
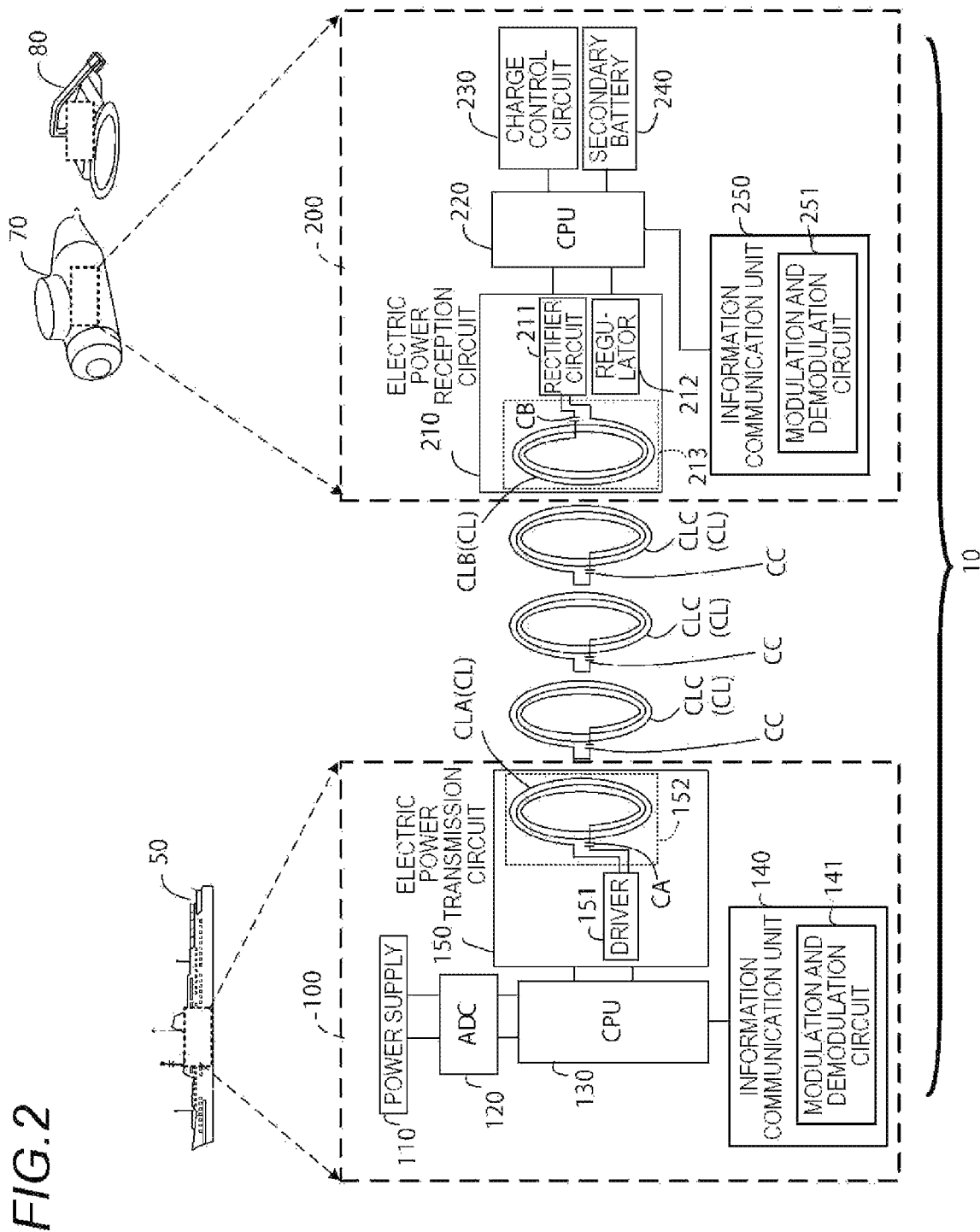
FIG. 2 is a block diagram showing a configuration example of the electric power transmission system.

FIG. 1 is a schematic diagram showing an example of an environment in which an electric power transmission system 10 according to a first embodiment is placed. FIG. 2 is a block diagram showing a configuration example of the electric power transmission system. The electric power transmission system 10 includes an electric power transmission device 100, an electric power reception device 200, and a plurality of coils CL. The electric power transmission device 100 wirelessly (no contact point) transmits electric power to the electric power reception device 200 via the plurality of coils CL in accordance with a magnetic resonance method. The number of the coils CL is n (n≥2), and can be set to any number.

The coil CL is formed in an annular shape, for example, and is accommodated in a waterproof plastic tube (described below). The coil CL is, for example, a helical coil or a spiral coil. The helical coil is an annular coil wound in the same plane. The spiral coil is an annular coil which is wound not in the same plane but in a spiral shape along a transmission direction of electric power in the magnetic resonance method. The coil CL is formed of, for example, a cab tire cable. The plurality of coils CL include an electric power transmission coil CLA and an electric power reception coil CLB. The electric power transmission coil CLA is a primary coil, and the electric power reception coil CLB is a secondary coil.

The coils CL may include one or more booster coils CLC disposed between the electric power transmission coil CLA and the electric power reception coil CLB. The booster coils CLC are disposed substantially parallel to each other, and half or more of opening surfaces formed by the booster coils CLC overlap with each other. An interval between a plurality of booster coils CLC is ensured, for example, to be larger than a radius of the booster coil CLC. The booster coil CLC assists electric power transmission of the electric power transmission coil CLA. The booster coil CLC may be a non-electric-power-supplied coil.

The electric power transmission coil CLA is provided in the electric power transmission device 100. The electric power reception coil CLB is provided in the electric power reception device 200. The booster coils CLC may be provided in the electric power transmission device 100 or in the electric power reception device 200, or may further be provided separately in the electric power transmission device 100 and the electric power reception device 200. A part of the booster coils CLC may be provided in the electric power transmission device 100, and the rest of the booster coils CLC may be provided in the electric power reception device 200.

The electric power transmission device 100 is installed in a watercraft 50. The electric power reception device 200 is installed in a movable underwater vehicle 60 (for example, a submarine 70 or an underwater excavator 80) or an electric power reception device that is fixedly installed (for example, a seismometer, a monitoring camera, a geothermal power generator). Each coil CL is disposed in water (for example, in sea).

For example, the submarine 70 may include a remotely operated vehicle (ROV), an unmanned underwater vehicle (UUV), or an autonomous underwater vehicle (AUV).

A part of the watercraft 50 is above a water surface 90 (for example, a sea surface), that is, on the water, and the other part of the watercraft 50 is below the water surface 90, that is, underwater. The watercraft 50 is movable on the water and can move freely to, for example, the water of a data acquisition location. A power supply electric wire 20 is connected between the electric power transmission device 100 and the electric power transmission coil CLA of the watercraft 50. The power supply electric wire 20 is connected to, for example, a driver 151 (see FIG. 2) in the electric power transmission device 100 via a connector on the water (not shown).

The underwater vehicle 60 is in the water or on a water bottom 95 (for example, a sea bottom) and travels in the water or on the water bottom 95. For example, the underwater vehicle 60 can move freely to a data acquisition point according to an instruction from the watercraft 50 on the water. The instruction from the watercraft 50 may be transmitted by communication via each coil CL, or may be transmitted by other communication methods.

In FIG. 1, among the plurality of coils CL, the electric power transmission coil CLA is accommodated in a double structure plastic tube 300. Two booster coils CLC are accommodated in two waterproof plastic tubes 330, 340, respectively. For example, a coil structure body 5 may be formed by connecting plastic tubes, arranged at equal intervals in the water depth direction, with a plurality of connecting ropes 335, the plastic tubes including the double structure plastic tube 300 and the waterproof plastic tubes 330, 340.

Weights 40 may be suspended at lower ends of at least a part (for example, four) of the plurality (for example, eight) of connecting ropes 335. The weight 40 restricts movement of the connecting rope 335, and restricts movement of the double structure plastic tube 300 and the two waterproof plastic tubes 330, 340, which are connected to the connecting rope 335. That is, the weight 40 restricts movement of the coil CL. The weight 40 may be included in the coil structure body 5. The weight 40 may not be provided.

A distance between the coils CL which are adjacent to each other in the water depth direction (coil interval) is, for example, 5 m. The coil interval may be about half of a diameter of the coil CL. A transmission frequency is, for example, 40 kHz or less and is preferably less than 10 kHz in consideration of an attenuation amount of a magnetic field intensity in the water (for example, in fresh water or in sea). The transmission frequency may also be 40 kHz or more. In a case where electric power is transmitted at a transmission frequency of 10 kHz or more, it is necessary to perform a predetermined simulation based on regulations of the Radio Act, and this operation can be omitted in cases of less than 10 kHz. An electric power transmission distance increases as the transmission frequency becomes lower, and the coil interval increases as the coil CL becomes larger. The transmission frequency may be higher than 40 kHz, when communication signals are superimposed, for example.

The transmission frequency is determined based on coil characteristics such as an inductance of the coil CL, the diameter of the coil CL, the number of turns of the coil CL. The diameter of the coil CL is, for example, from several meters to several tens of meters. An electric resistance in the coil CL and electric power loss is lowered as a size of the coil CL increases, that is, as a wire diameter of the coil CL increases. Electric power transmitted via the coil CL is, for example, 50 W or more, and may be 1 kW or more.

When a water flow is generated in water, the weight 40 restricts the movement of the double structure plastic tube 300 and the two waterproof plastic tubes 330, 340, that is, movement of each coil CL. Therefore, reduction in efficiency of electric power transmission using the coil CL can be inhibited.

A surface formed by each coil CL may be substantially parallel to the water surface 90. In this case, electric power can be transmitted in the water depth direction (direction substantially orthogonal to the water surface) by the magnetic field resonance method using each coil CL.

A buoy may be connected to an upper end portion (water surface side when underwater) of the connecting rope 335. In a case when the weight 40 is connected to a lower end portion (water bottom side when underwater) of the connecting rope 335, and the buoy is connected to the upper end portion of the connecting rope 335, the weight 40 is located on the water bottom side while the buoy is located on the water surface side, and a posture, in which the coil structure body 5 is substantially perpendicular to the water surface 90, can be easily maintained. The buoy may be included in the coil structure body 5.

The weight 40 may be detached from the connecting rope 335 during transportation of the coil structure body 5, and the weight 40 may be attached to the connecting rope 335 when the transportation of the coil structure body 5 is completed and the coil structure body 5 is installed at a predetermined position. Accordingly, the transportation of the coil structure body 5 is facilitated.

As shown in FIG. 2, the electric power transmission system 10 includes the electric power transmission device 100 and the electric power reception device 200. The electric power transmission device 100 includes a power supply 110, an AC/DC converter (ADC) 120, a central processing unit (CPU) 130, an information communication unit 140, and an electric power transmission circuit 150.

The ADC 120 converts AC power supplied from the power supply 110 into DC power. The converted DC power is transmitted to the electric power transmission circuit 150. The CPU 130 (an example of a processor) generally controls operations of each unit of the electric power transmission device 100 (for example, the power supply 110, the ADC 120, the information communication unit 140, and the electric power transmission circuit 150).

The information communication unit 140 includes a modulation and demodulation circuit 141 configured to modulate or demodulate communication data communicated between the information communication unit 140 and the electric power reception device 200. The information communication unit 140 transmits, via the coil CL, control information from the electric power transmission device 100 to the electric power reception device 200, for example. The information communication unit 140 receives, via the coil CL, data from the electric power reception device 200 to the electric power transmission device 100, for example. This data includes, for example, data of exploration results obtained by underwater exploration or water bottom exploration of the electric power reception device 200. Through the information communication unit 140, data communication can be quickly performed between the information communication unit 140 and the underwater vehicle 60 while the underwater vehicle 60 is performing operation such as data collection.

The electric power transmission circuit 150 includes the driver 151 and a resonance circuit 152. The driver 151 converts the DC power from the ADC 120 into an AC voltage (pulse waveform) having a predetermined frequency. The resonance circuit 152 includes a capacitor CA and the electric power transmission coil CLA, and generates a sinusoidal waveform AC voltage based on the pulse waveform AC voltage from the driver 151. The electric power transmission coil CLA resonates at a predetermined resonance frequency in accordance with the AC voltage applied from the driver 151. The electric power transmission coil CLA is impedance-matched with an output impedance of the electric power transmission device 100. The predetermined frequency according to the AC voltage obtained by the conversion of the driver 151 corresponds to the transmission frequency of the electric power transmission between the electric power transmission device 100 and the electric power reception device 200, and corresponds to the resonance frequency. The transmission frequency may be set based on, for example, a Q factor of each coil CL.

The electric power reception device 200 includes an electric power reception circuit 210, a CPU 220, a charge control circuit 230, a secondary battery 240, and an information communication unit 250. The electric power reception circuit 210 includes a rectifier circuit 211, a regulator 212, and a resonance circuit 213. The resonance circuit 213 includes a capacitor CB and the electric power reception coil CLB, and receives AC power transmitted from the electric power transmission coil CLA. The electric power reception coil CLB is impedance-matched with an input impedance of the electric power reception device 200. The rectifier circuit 211 converts AC power induced in the electric power reception coil CLB to DC power. The regulator 212 converts DC voltage transmitted from the rectifier circuit 211 to a predetermined voltage suitable for charging the secondary battery 240.

The CPU 220 (an example of the processor) generally controls operations of each unit of the electric power reception device 200 (for example, the electric power reception circuit 210, the charge control circuit 230, the secondary battery 240, and the information communication unit 250). The charge control circuit 230 controls charging of the secondary battery 240 according to a type of the secondary battery 240. For example, in a case where the secondary battery 240 is a lithium ion battery, the charge control circuit 230 starts charging the secondary battery 240 at a constant voltage using DC power from the regulator 212. The secondary battery 240 accumulates the electric power transmitted from the electric power transmission device 100. The secondary battery 240 is, for example, a lithium ion battery.

The information communication unit 250 includes a modulation and demodulation circuit 251 configured to modulate or demodulate communication data communicated between the information communication unit 250 and the electric power transmission device 100. The information communication unit 250 receives, via the coil CL, the control information from the electric power transmission device 100 to the electric power reception device 200, for example. The information communication unit 250 transmits, via the coil CL, the data from the electric power reception device 200 to the electric power transmission device 100, for example. This data includes, for example, data of exploration results obtained by underwater exploration or water bottom exploration of the electric power reception device 200. Through the information communication unit 250, data communication can be quickly performed between the information communication unit 250 and the watercraft 50 while the underwater vehicle 60 is performing operation such as data collection.

Similarly to the electric power transmission coil CLA and the electric power reception coil CLB, the booster coil CLC forms a resonance circuit together with a capacitor CC. That is, in the present embodiment, since the resonance circuit is arranged in multiple stages in the water, the electric power is transmitted by the magnetic resonance method.

Next, electric power transmission from the electric power transmission device 100 to the electric power reception device 200 will be described. In the resonance circuit 152, when a current flows through the electric power transmission coil CLA of the electric power transmission device 100, a magnetic field is generated around the electric power transmission coil CLA. Oscillation of the generated magnetic field is transmitted to a resonance circuit including the booster coil CLC that resonates at the same frequency or the resonance circuit 213 including the electric power reception coil CLB.

In the resonance circuit including the booster coil CLC, a current is excited in the booster coil CLC by the oscillation of the magnetic field, the current flows, and a magnetic field is further generated around the booster coil CLC. Oscillation of the generated magnetic field is transmitted to a resonance circuit including another booster coil CLC that resonates at the same frequency or the resonance circuit 213 including the electric power reception coil CLB.

In the resonance circuit 213, an alternating current is induced in the electric power reception coil CLB by the oscillation of the magnetic field of the booster coil CLC or the electric power transmission coil CLA. The induced alternating current is rectified, converted to a predetermined voltage, and charged to the secondary battery 240.

Figure 3:
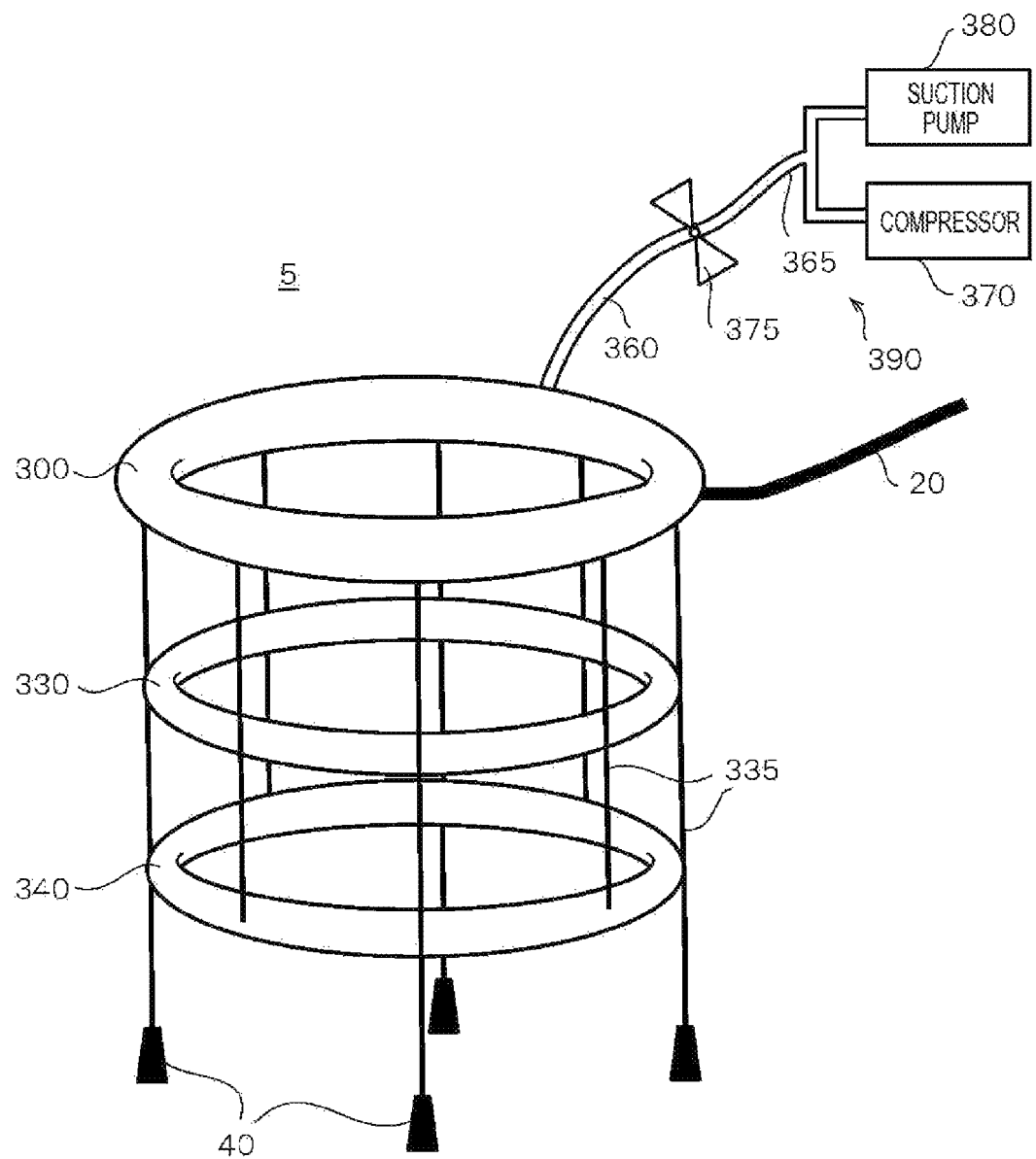
FIG. 3 is a perspective view showing a shape of a coil structure body.

FIG. 3 is a perspective view showing an appearance of the coil structure body 5.

The coil structure body 5 includes a plurality of plastic tubes connected in series by a plurality of (for example, eight) connecting ropes 335. Each of the plurality of plastic tubes encloses each of the plurality of coils CL and the inside of the tubes is sealed. The plurality of coils CL may include the electric power transmission coil CLA and may include the booster coil CLC. The plastic tube may include the double structure plastic tube 300 and two waterproof plastic tubes 330, 340.

The double structure plastic tube 300 may be formed in an annular shape (ring shape) and accommodate the electric power transmission coil CLA (electric power supply coil) therein. The two waterproof plastic tubes 330, 340 may be formed in annular shapes, and may accommodate the booster coil CLC in each tube. The number of the waterproof plastic tubes that accommodate the booster coils CLC is not limited to two, and may be any number.

The weight 40 may be attached to each lower end of at least a part (for example, four) of the connecting ropes 335 among the plurality of (for example, eight) connecting ropes 335, so that the coil structure body 5 can stably maintain a position in a vertical direction (water depth direction) in the water (including circumstances in the sea). The upper ends of the connecting ropes 335 may be fixed to the double structure plastic tube 300 at regular intervals.

An adjuster 390 is connected to the double structure plastic tube 300 to appropriately adjust an amount of air in the tube. The adjuster 390 includes, for example, a suction and discharge tube 360, a valve 375, a bifurcated tube 365, a compressor 370, and a suction pump 380. The adjuster 390 may be installed, for example, on the sea. At least a part of the adjuster 390 may be provided in the watercraft 50.

Opening and closing of the valve 375, an operation of the compressor 370, and an operation of the suction pump 380 in the adjuster 390 may be controlled by any arbitrary control device. The control device may be included in the electric power transmission device 100, or may be provided separately from the electric power transmission device 100. The controller may transmit control signals for controlling the opening and closing of the valve 375, the operation of the compressor 370 and the operation of the suction pump 380 to the valve 375, the compressor 370 and the suction pump 380 via wired or wireless connection.

The suction and discharge tube 360 is connected to the double structure plastic tube 300 and serves as a path for air in the tube to flow in and out, so as to enable the coil structure body 5 to float and submerge in the water. The suction and discharge tube 360 is connected to the compressor 370 and the suction pump 380 via the valve 375 and the bifurcated tube 365.

The compressor 370 sends air to the double structure plastic tube 300 through the suction and discharge tube 360. When the compressor 370 is in a non-operation state, an outlet of the compressor 370 is closed. When the compressor 370 is in an operation state, the outlet of the compressor 370 is opened.

The suction pump 380 suctions air stored in the double structure plastic tube 300 through the suction and discharge tube 360. When the suction pump 380 is in the non-operation state, an air inlet of the suction pump 380 is closed. When the suction pump 380 is in the operation state, the air inlet of the suction pump 380 is opened.

When one of the compressor 370 and the suction pump 380 is in the operation state, the other is in the non-operation state. Therefore, no air flows in or out between the compressor 370 and the suction pump 380.

It should be noted that the suction pump 380 may be omitted. When the bifurcated tube 365 connected to the suction and discharge tube 360 is opened through the valve 375, the air in the double structure plastic tube 300 may flow out. When the double structure plastic tube 300 is sunk in the sea, the air in the double structure plastic tube 300 may be discharged from the bifurcated tube 365 by water pressure. In this case, even if the air in the double structure plastic tube 300 is not forcibly suctioned by the suction pump 380, the amount of air in the tube gradually decreases. However, due to a volume of the double structure plastic tube 300, the amount of air to be discharged is large, thus a large amount of time is required to reduce the amount of air to a predetermined amount. Therefore, when the air is suctioned by the suction pump 380, the adjuster 390 can reduce the amount of air in the double structure plastic tube in a short time.

The valve 375 opens and closes the air inlet of the suction pump 380, the bifurcated tube 365 connected to the outlet of the compressor 370, and the suction and discharge tube 360. The valve 375 may have a structure that can be opened and closed by driving an electromagnetic valve, or may have a structure that can be manually opened and closed.

The power supply electric wire 20 is attached to the double structure plastic tube 300. The power supply electric wire 20 is connected (for example, fixed) to a wall surface of the double structure plastic tube 300 via a resin mold or a waterproof connector. The power supply electric wire 20 is connected to the electric power transmission coil CLA accommodated in the double structure plastic tube 300, and transmits electric power to the electric power transmission coil CLA.

Figure 4A:
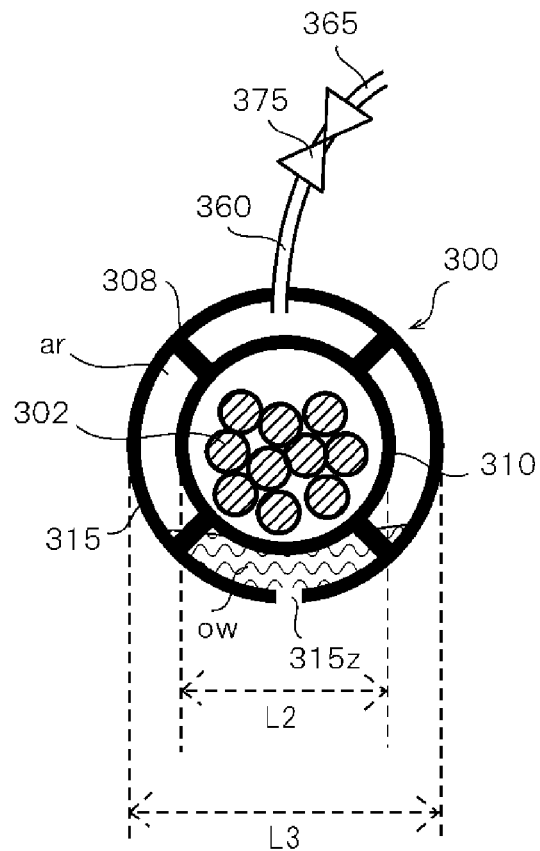
FIG. 4A is a vertical cross-sectional view showing a structure of a double structure plastic tube.
Figure 4B:
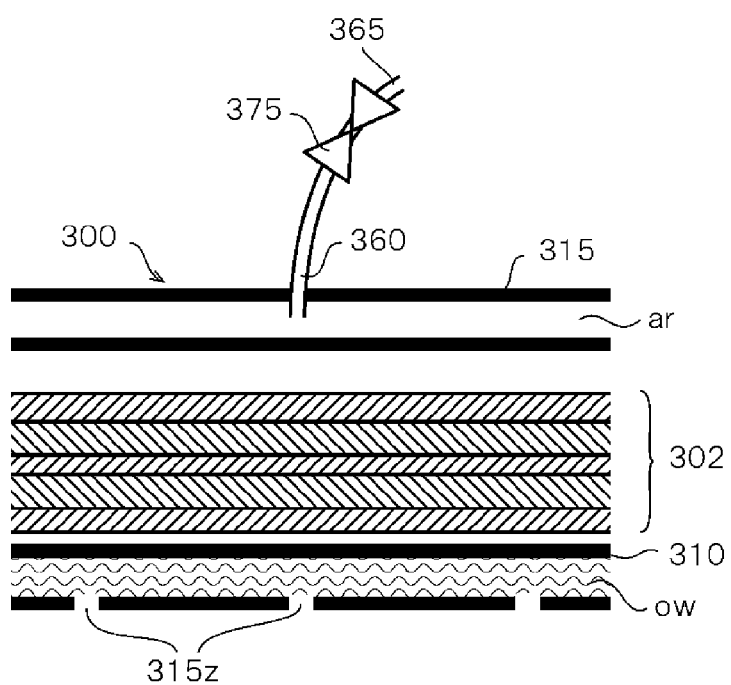
FIG. 4B is a horizontal cross-sectional view showing the structure of the double structure plastic tube.

FIG. 4A is a vertical cross-sectional view showing a structure example of the double structure plastic tube 300. FIG. 4B is a horizontal cross-sectional view showing the structure example of the double structure plastic tube 300. A vertical cross-section refers to a cross-section perpendicular to a tube axis. A horizontal cross-section refers to a cross-section parallel to the tube axis. The same also applies to the following vertical cross-sections and horizontal cross-sections.

The double structure plastic tube 300 has a double structure in which a waterproof plastic tube 310, in which a coil electric wire 302 is accommodated, and a plastic tube 315 surrounding the waterproof plastic tube 310 are arranged coaxially.

The waterproof plastic tube 310 may be formed of, for example, polyethylene resin or vinyl chloride resin. The polyethylene resin and the vinyl chloride resin are excellent in water resistance, durability, weather resistance, and availability. In particular, the polyethylene resin is preferably used, since the polyethylene resin is excellent in these properties. When the polyethylene resin or the vinyl chloride resin is used for the waterproof plastic tube 310, long-term reliability is improved. The waterproof plastic tubes 330 and 340 may also be formed of the same material as the waterproof plastic tube 310.

The plastic tube 315 may be waterproof or may not be waterproof. The plastic tube 315 may be formed of, for example, the polyethylene resin or the vinyl chloride resin.

A diameter of a ring (circular ring) of the double structure plastic tube 300 is, for example, 3.5 m (see L1 in FIG. 1). As for tube diameters of the double structure plastic tube 300, an outer diameter of an inner side (waterproof plastic tube 310) is, for example, 140 mm (see L2 in FIG. 4A), and an outer diameter of an outer side (plastic tube 315) is, for example, 200 mm (see L3 in FIG. 4A).

Spacer 308 may be provided between an outer periphery of the waterproof plastic tube 310 and an inner periphery of the plastic tube 315, the spacers 308 supporting an outer peripheral surface of the waterproof plastic tube 310 and an inner peripheral surface of the plastic tube 315 at four locations, for example, in a peripheral direction. The spacers 308 support the outer periphery of the waterproof plastic tube 310 and the inner periphery of the plastic tube 315 at regular intervals. The spacer 308 is formed into a cylindrical shape, for example, and is inserted into a gap between the waterproof plastic tube 310 and the plastic tube 315. The spacer 308 can reinforce the waterproof plastic tube 310 and the plastic tube 315, so that the waterproof plastic tube 310 and the plastic tube 315 do not deform even when an external force (for example, water pressure) is applied to the double structure plastic tube 300. The spacer 308 is disposed in a manner that does not block a flow of sea water ow or air ar in the gap between the waterproof plastic tube 310 and the plastic tube 315.

A plurality of holes 315$z$ are formed in a dispersed manner below a side surface of the plastic tube 315 along a longitudinal direction. The plurality of holes 315$z$ may be formed at substantially equal intervals. Since the plurality of holes 315$z$ are arranged in the dispersed manner, enlargement of opening portions caused by concentrated arrangement is inhibited, and strength of the plastic tube 315 is inhibited from deteriorating. For example, when the diameter of the ring of the double structure plastic tube 300 is 3.5 m, diameters of the plurality of holes 315$z$ may be 10 mm or more (for example, 20 mm).

When the double structure plastic tube 300 is submerged in the sea or down to a sea bottom, the air ar stored in space between the outer periphery of the waterproof plastic tube 310 and the inner periphery of the plastic tube 315 may be suctioned to the outside by the suction pump 380. In this case, the sea water ow flows into the plastic tube 315 through the hole 315$z$, and is stored in the gap between the waterproof plastic tube 310 and the plastic tube 315.

Meanwhile, when the coil structure body 5 is floated in the sea or on the sea surface, the air ar is sent to the space between the outer periphery of the waterproof plastic tube 310 and the inner periphery of the plastic tube 315 by the compressor 370. By increasing air pressure in the tube, the sea water ow stored in the tube is discharged to the outside through the hole 315$z$. In the double structure plastic tube 300, the amount of air increases as the sea water ow flows out. A specific gravity of the air ar is smaller than a specific gravity of the sea water ow. By increasing a volume of the air ar, which is lighter than the sea water ow, in the tube, buoyancy of the double structure plastic tube 300 is increased, and the coil structure body 5 is easily floated.

In FIGS. 4A and 4B, a state in which the air ar is sent into the double structure plastic tube 300 is shown. In Figs. 4A and 4B, in the gap between the waterproof plastic tube 310 and the plastic tube 315, the air ar takes up about ¾ of the gap on an upper side, and the sea water ow is stored in about ¼ of the gap on a lower side. In this state, since there is a large amount of air ar in the tube, the buoyancy applied to the double structure plastic tube 300 is large. The coil structure body 5 is stopped when a downward gravity and upward buoyancy applied to the entire coil structure body 5 are balanced. Therefore, for example, when the valve 375 is closed at a desired water depth during floating of the coil structure body 5, the coil structure body 5 maintains the water depth. When the double structure plastic tube 300 of the coil structure body 5 is floated on the sea surface, the amount of air in the double structure plastic tube 300 may be filled without closing the valve 375 connected to the compressor 370 halfway.

Figure 5A:
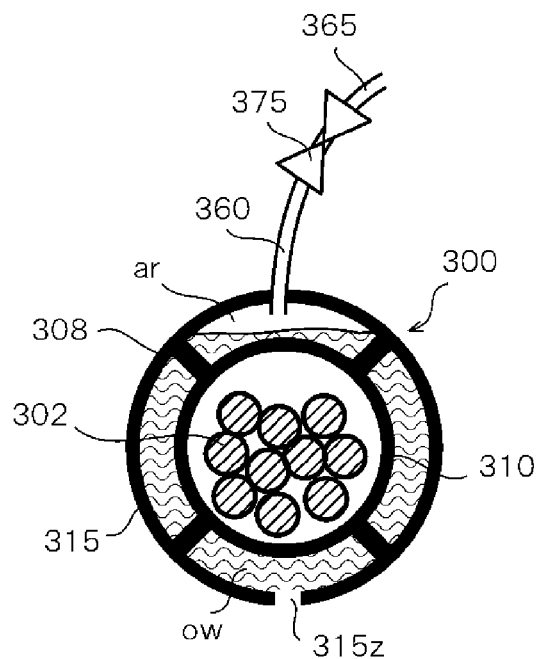
FIG. 5A is a vertical cross-sectional view showing a structure of a double structure plastic tube.
Figure 5B:
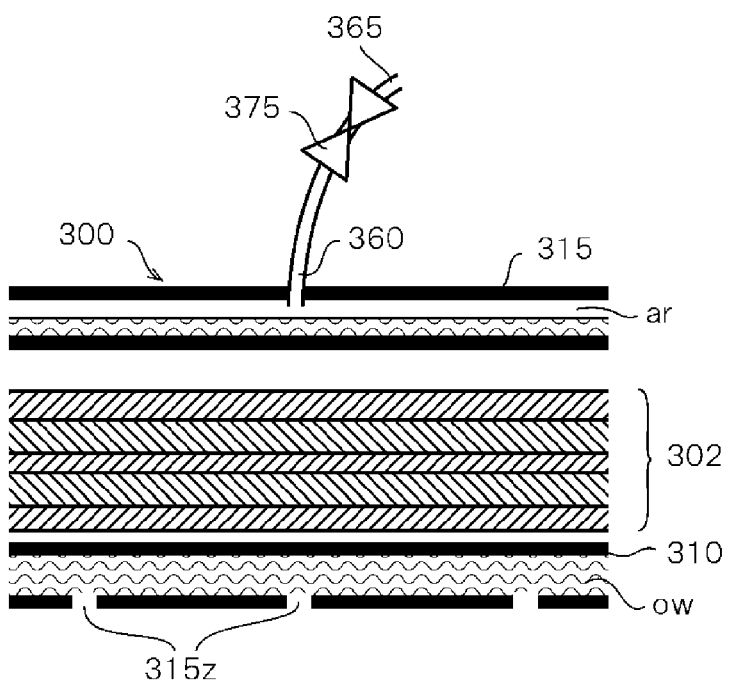
FIG. 5B is a horizontal cross-sectional view showing the structure of the double structure plastic tube.

FIG. 5A is a vertical cross-sectional view showing a structure example of the double structure plastic tube 300. FIG. 5B is a horizontal cross-sectional view showing the structure example of the double structure plastic tube 300.

When the coil structure body 5 is sunk in the sea, the above-mentioned control device operates the suction pump 380. When the air ar in the space between the outer periphery of the waterproof plastic tube 310 and the inner periphery of the plastic tube 315 is discharged by the suction pump 380, the air pressure in the tube is decreased. When the air pressure in the tube is decreased, the sea water ow flows into the tube through the hole 315z. Accordingly, the buoyancy of the double structure plastic tube 300 is reduced, and the coil structure body 5 is sunk.

In FIGS. 5A and 5B, a state in which air is discharged from the double structure plastic tube 300 is shown. In FIGS. 5A and 5B, in the gap between the waterproof plastic tube 310 and the plastic tube 315, a small amount of air ar remains on the upper side, and a large amount of sea water ow is stored on the lower side. In this state, since there is almost no air ar in the double structure plastic tube 300, the buoyancy acting on the double structure plastic tube 300 is small. The coil structure body 5 is stopped when a downward gravity and upward buoyancy applied to the entire coil structure body 5 are balanced. Therefore, for example, when the valve 375 is closed at a desired water depth during sinking of the coil structure body 5, the coil structure body 5 maintains the water depth. When the coil structure body 5 is sunk to the sea bottom, the amount of air in the double structure plastic tube 300 may be substantially zero without closing the valve 375 connected to the suction pump 380 halfway.

As described above, in the electric power transmission system 10 according to the first embodiment, the electric power transmission device 100 transmits electric power to the electric power reception device 200 including the electric power reception coil CLB in the water (for example, in the sea). The electric power transmission device 100 includes: one or more coils CL including the electric power transmission coil CLA that transmits electric power to the electric power reception coil CLB via the magnetic field; the driver 151 that transmits AC power to the electric power transmission coil CLA; and the capacitor CA that is connected with the electric power transmission coil CLA and forms the resonance circuit 152 that resonates with the electric power transmission coil CLA. The electric power transmission device 100 includes: the waterproof plastic tube 310 which is waterproof and seals the periphery of the coil CL; the plastic tube 315 that surrounds the waterproof plastic tube 310 and includes the plurality of holes 315z; and the adjuster 390 that adjusts the amount of air ar in the space between the waterproof plastic tube 310 and the plastic tube 315.

The coil CL is an example of a transmission coil. The driver 151 is an example of an electric power transmitter. The waterproof plastic tube 310 is an example of a first tubular member. The plastic tube 315 is an example of a second tubular member. The space between the waterproof plastic tube 310 and the plastic tube 315 is an example of a gap.

Since the plastic tube 315 includes the plurality of holes 315z, when the coil CL is disposed in water, the water can flow to the inside from the plurality of holes 315z. Since the air amount in the gap is adjusted by the adjuster 390, the water (for example, the sea water ow) flows in when the air ar flows out from the gap, and the water, which flows into the gap, flows out when the air ar flows into the gap. Since the specific gravity of the water is larger than the specific gravity of the air ar, the coil CL is easily floated when the amount of air increases. In contrast, when the amount of air decreases, the coil CL sinks easily. Therefore, the electric power transmission device 100 can freely float or sink the coil CL. That is, the coil structure body 5 which includes the plurality of coils CL has a function of floating and sinking. Since the waterproof plastic tube 310 is waterproof, the electric power transmission device 100 can prevent the coil CL from contacting the water even if the water flows into the gap. Therefore, the electric power transmission device 100 can prevent the coil CL from being short-circuited, and can use the coil CL to transmit electric power in the water. In this way, the electric power transmission device 100 can easily change an arrangement position, in the water depth direction, of the coil CL which is configured to transmit electric power in the water. The double structure plastic tube 300 including the waterproof plastic tube 310 and the plastic tube 315 has high weather resistance.

The waterproof plastic tube 310 may seal the periphery of the coil CL (for example, the electric power transmission coil CLA) arranged at a position closest to the water surface among the plurality of coils CL arranged side by side in the water depth direction.

Accordingly, the electric power transmission device 100 adjusts the position of the coil CL closest to the water surface in the water depth direction, thereby facilitating adjustment of a position of the entire coil structure body 5. The waterproof plastic tube 310 is disposed at one location instead of being disposed around each coil, so that the coil structure body 5 can realize the floating and sinking function with a simple configuration. A state of the double structure plastic tube 300 including the coil CL therein can be easily checked on the water.

When a reflection coil is disposed at a position closer to the water surface than the electric power transmission coil CLA, for example, a periphery of the reflection coil may be sealed by the waterproof plastic tube 310. That is, the double structure plastic tube 300 may be formed around the reflection coil.

The electric power transmission device 100 may include the spacer 308 that supports the outer peripheral surface of the waterproof plastic tube 310 and the inner peripheral surface of the plastic tube 315 in the gap between the waterproof plastic tube 310 and the plastic tube 315.

Accordingly, constant space can be secured between the plastic tube 315 and the waterproof plastic tube 310, and space in which a desired amount of air or water can flow can be secured. The plastic tube 315 and the waterproof plastic tube 310 have rigid structures, and are difficult to deform even when an external force is applied. Therefore, the electric power transmission device 100 can secure a substantially constant inner volume of the tube and easily adjust the buoyancy acting on the double structure plastic tube 300.

The adjuster 390 may include the compressor 370 that sends air to the gap between the waterproof plastic tube 310 and the plastic tube 315, and the suction pump 380 that suctions air from the gap.

Accordingly, the electric power transmission device 100 can make the air in the gap flow in and out by a force from an external device. When the suction pump 380 is used in the electric power transmission device 100, the air can be discharged from the gap at a high speed, as compared with a case where only the valve 375 is opened without using the suction pump 380.

The plurality of holes 315z may be disposed in a dispersed manner along the longitudinal direction of the plastic tube 315 (a direction in which the plastic tube 315 extends).

Accordingly, since positions of the plurality of holes 315z are not irregular, the electric power transmission device 100 can prevent water from easily flowing in from a part of the holes 315z, thus strength of the plastic tube 315 can be maintained. Thus a long-term reliability of the double structure plastic tube 300 is improved.

The coil CL may transmit electric power in a direction substantially orthogonal to the water surface.

Accordingly, the electric power transmission device 100 can extend an electric power transmission distance in the water depth direction, and can supply electric power to the electric power reception device 200 positioned at a location that is deep in the water (for example, deep sea), thereby improving operation efficiency of the electric power reception device 200.

The electric power transmission coil CLA may transmit electric power and perform data communication.

Accordingly, the electric power reception device 200 can be charged with electric power from the electric power transmission device 100 and perform data communication with the electric power transmission device 100 while inhibiting reduction in efficiency of operations such as data collection.

Further, according to the electric power transmission device 100 and the electric power transmission system 10, even in an environment in which there is a flow in the water, the electric power reception device 200 (for example, the underwater vehicle 60) can inhibit the reduction in the efficiency of electric power transmission using the magnetic resonance method and stably receive electric power without necessarily contact the electric power transmission coil CLA. Therefore, the underwater vehicle 60 can receive continuous electric power supply while performing operations such as data collection, thus an operation rate of the underwater vehicle 60 is improved when the supplied electric power is received. Thus the electric power transmission device 100 can improve efficiency of data collection operation in the water.

The electric power transmission device 100 can wirelessly transmit electric power by the magnetic resonance method through using the electric power transmission coil CLA of the electric power transmission device 100 and the power reception coil CLB of the electric power reception device 200. Since the underwater vehicle 60 can receive electric power without being moved to a predetermined power supply location, the underwater vehicle 60 can move freely even when the electric power is being supplied, thus the electric power transmission device 100 can perform position-free electric power transmission. Thus the electric power transmission device 100 can prevent the operation of the underwater vehicle 60 performed in the water or on the water bottom 95 from being inhibited. Thus the underwater vehicle 60 can expand a working range even during charging and can be continuously charged during working. Since the underwater vehicle 60 can be charged at any timing, a working time thereof can be shortened.

Since the booster coil CLC is used in the electric power transmission device 100, an electric power transmission distance of continuous electromagnetic induction can be extended. For example, as shown in FIG. 1, by arranging the booster coil CLC in multiple stages from the vicinity of the water surface 90 toward a direction of the water bottom, the electric power transmission device 100 can transmit electric power to a deep position in the water. In this case, the electric power transmission device 100 can wirelessly transmit electric power to the underwater vehicle 60 which performs seafloor resource extraction or investigation, and can inhibit reduction in the operation rate of the underwater vehicle 60 when electric power is being supplied.

The underwater vehicle 60 can be operated even when the underwater vehicle 60 does not include a large battery for operating without electric power supply. In this case, a size and weight of the underwater vehicle 60 can be reduced.

Second Embodiment (Aquaculture Container Including Double Structure Plastic Tube in which No Electric Power Transmission Coil is Accommodated)

For example, as disclosed in JP-A-2017-169452, an aquaculture container, which is disposed in an ocean for fish farming, is known. The aquaculture container includes a main body portion formed of a soft sheet material. A shape of the main body portion is maintained by aquaculture water supplied from a pump. Since the aquaculture water occupies most of the weight of the main body portion, the aquaculture container is floated by a small amount of buoyancy. Therefore, the aquaculture container can be connected to an aquaculture container frame while floating in the ocean. A float can also be provided to float the aquaculture container in the ocean.

Although various fish and the like are farmed in the aquaculture container, suitable environments are different depending on types of the fish and the like. For example, some types of fish and the like are suitable for farming at a relatively shallow position in the water depth direction, while some types of fish and the like are suitable for farming at a relatively deep position in the water depth direction. For this reason, a position of the aquaculture container in the water depth direction is preferably variable.

The present disclosure of a second embodiment relates to an aquaculture container configured to farm fish in water, and provides an aquaculture container capable of changing positions in the water depth direction.

An aspect of the disclosure according to the second embodiment is an aquaculture container configured to farm fish in water. The aquaculture container includes: a main body portion, configured to surround fish in the water; a waterproof first tubular member, the inside of which is sealed; a second tubular member, which is connected to the main body portion and surrounds the first tubular member, the second tubular member including a plurality of holes; and an adjuster, configured to adjust an amount of air in a gap between the first tubular member and the second tubular member.

According to the disclosure of the second embodiment, the aquaculture container capable of changing the positions in the water depth direction can be provided.

Figure 6:
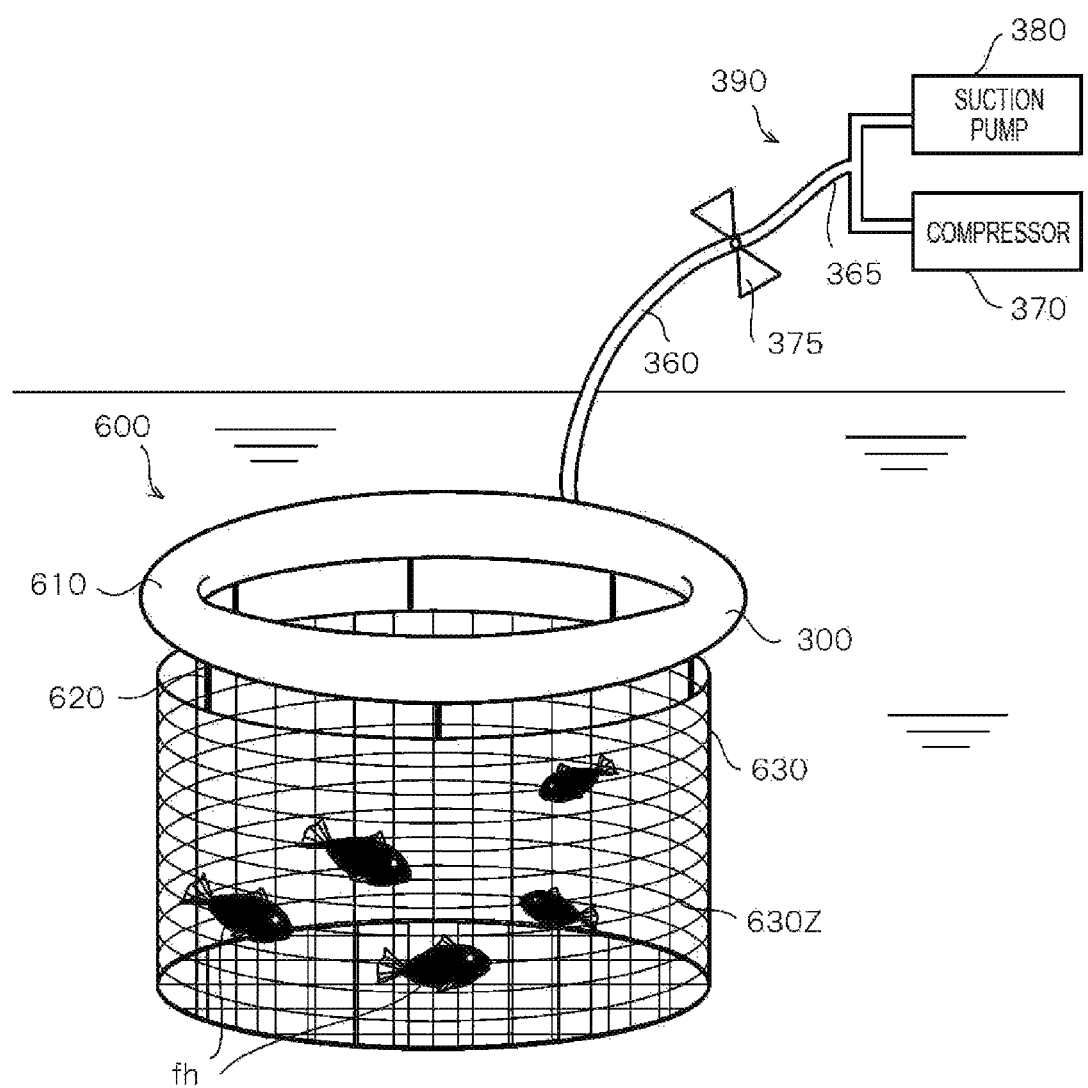
FIG. 6 is a perspective view showing an appearance of an aquaculture container according to a second embodiment.

FIG. 6 is a perspective view showing an appearance example of an aquaculture container 600 according to the second embodiment. The same members as those of the first embodiment are denoted by the same reference numerals, and the description thereof will be omitted or simplified. The aquaculture container 600 includes: an aquaculture container frame 610 formed in an annular shape (for example, a ring shape); and an aquaculture container cage 630 suspended by a connecting rope 620 on the aquaculture container frame 610.

The aquaculture container frame 610 includes the double structure plastic tube 300. Since a structure of the double structure plastic tube 300 is the same as the structure of the double structure plastic tube 300 shown in the first embodiment, a detailed description thereof will be omitted or simplified. The double structure plastic tube 300 may include, for example, the waterproof plastic tube 310, which is waterproof, the inside of the waterproof plastic tube 310 being sealed, and the plastic tube 315, which is connected to the aquaculture container cage 630 and surrounds the waterproof plastic tube 310, the plastic tube 315 including the plurality of holes 315z. An arrangement of the plurality of holes 315z may be the same as the arrangement in the first embodiment. The double structure plastic tube 300 may include the spacer 308. Here, the electric power transmission coil CLA is not accommodated in the waterproof plastic tube 310.

Although the waterproof plastic tube 310 is used as an example of an inner plastic tube of the double structure plastic tube 300, an ordinary plastic tube which is not waterproof may also be used since no electric wire is accommodated in the tube. When the ordinary plastic tube is used, air and sea water flow in and out, so a speed of floating and sinking can be increased.

The aquaculture container 600 also includes the adjuster 390 which can adjust an amount of air inside the aquaculture container frame 610. As in the first embodiment, the adjuster 390 is connected to the double structure plastic tube 300. The adjuster 390 includes the suction and discharge tube 360, the valve 375, the bifurcated tube 365, the compressor 370, and the suction pump 380. The compressor 370 and the suction pump 380 are installed on the water, for example, installed on a land or on the watercraft 50. An operation of the adjuster 390 is the same as the operation in the first embodiment.

The aquaculture container cage 630 has a structure in which, for example, a cylindrical-shaped frame body is surrounded by a net 630Z. The frame body is formed by bending a rod material, such as long materials made of plastic, metal, corrosion resistant wood. It should be noted that the frame body may be omitted in the aquaculture container cage 630. The net 630Z is spread on upper, bottom, and side surfaces of the aquaculture container cage 630. For example, when an upper end of the aquaculture container cage 630 is positioned on the sea, the net 630Z may not be provided on the upper surface of the aquaculture container cage 630. Aquatic products, including fish fh, are farmed in the aquaculture container cage 630. A size of the aquaculture container cage 630 is optionally determined based on the aquatic products, which are subjects of the farming. Examples of the aquatic products include fish, such as red sea bream, Japanese amberjack, greater amberjack, Japanese sea bass, Takifugu rubripes, olive flounder, and common carp, and aquatic products other than fish, which can be subjects of aquaculture, such as kuruma shrimp, Japanese spiny lobster, abalone, Turbo sazae, common octopus, and Japanese eel.

When the aquaculture container 600 is sunk in the sea, the air ar in the space between the outer periphery of the waterproof plastic tube 310 and the inner periphery of the plastic tube 315 is suctioned and discharged by the suction pump 380. Accordingly, the amount of air in the double structure plastic tube 300 is reduced, and the aquaculture container is sunk. When gravity in a downward direction (for example, the direction of the sea bottom) and buoyancy in an upward direction (for example, the direction of the sea surface) applied to the aquaculture container 600 are balanced, the aquaculture container 600 stops movement in the water depth direction. Therefore, for example, when the valve 375 is closed at a desired water depth during sinking of the aquaculture container 600, the aquaculture container 600 maintains the water depth. At this time, in order to maintain the desired water depth, the aquaculture container 600 may be anchored with heavy stones to assist position fixing of the aquaculture container 600 in the water depth direction. Accordingly, the aquaculture container 600 can stay at a water depth suitable for fish farming.

When the aquaculture container 600 is sunk to the sea bottom, the amount of air in the double structure plastic tube 300 may be substantially zero without closing the valve 375 connected to the suction pump 380 halfway. In this case, the frame body of the aquaculture container cage 630 has enough strength, so the frame body does not deform on the sea bottom. Accordingly, in the aquaculture container cage 630 placed on the sea bottom, the water products such as Japanese spiny lobster, abalone, Turbo sazae and common octopus can be farmed.

Meanwhile, when the aquaculture container 600 is floated in the sea, the air ar is sent to the space between the outer periphery of the waterproof plastic tube 310 and the inner periphery of the plastic tube 315 by the compressor 370. By increasing air pressure in the tube, the sea water ow stored in the tube is discharged to the outside through the hole 315z. In the double structure plastic tube 300, the amount of air increases as the sea water ow flows out. A specific gravity of the air ar is smaller than a specific gravity of the sea water ow. By increasing the volume of the air ar, which is lighter than the sea water ow, in the tube, the buoyancy of the double structure plastic tube 300 is increased, and the aquaculture container 600 is easily floated. The aquaculture container 600 is stopped when downward gravity and upward buoyancy applied to the aquaculture container 600 are balanced. Therefore, for example, when the valve 375 is closed at a desired water depth during floating of the aquaculture container 600, the aquaculture container 600 maintains the water depth. In this case, in order to maintain the desired water depth, the aquaculture container 600 may be anchored with heavy stones. Accordingly, the aquaculture container 600 can stay at a water depth suitable for fish farming. For example, fish such as carangid and red sea bream can be farmed in the aquaculture container 600 at shallow positions in the sea, and fish such as Thunnus, greater amberjack and skipjack tuna can be farmed in the aquaculture container 600 at deep positions in the sea.

When the aquaculture container frame 610 of the aquaculture container 600 is floated on the sea surface, the amount of air in the double structure plastic tube 300 may be filled without closing the valve 375 connected to the compressor 370 halfway.

As described above, the aquaculture container 600 in the second embodiment is an aquaculture container configured to farm (breed) the aquatic products such as fish in the water (for example, in the sea). The aquaculture container 600 includes: the aquaculture container cage 630, which surrounds the fish or the like in the water; the waterproof plastic tube 310, which is waterproof and the inside of which is sealed; the plastic tube 315, which is connected to the aquaculture container cage 630 and surrounds the waterproof plastic tube 310, the plastic tube 315 including the plurality of holes 315z; and the adjuster 390, configured to adjust the amount of air in the gap between the waterproof plastic tube 310 and the plastic tube 315. The aquaculture container cage 630 is an example of the main body portion of the aquaculture container 600. The waterproof plastic tube 310 is an example of the first tubular member. The plastic tube 315 is an example of the second tubular member.

Since the plastic tube 315 includes the plurality of holes 315z, when the double structure plastic tube 300 of the aquaculture container 600 is disposed in water, the water can flow to the inside from the plurality of holes 315z. Since the air amount in the gap is adjusted by the adjuster 390, the water (for example, the sea water ow) flows in when the air ar flows out from the gap, and the water, which flows into the gap, flows out when the air ar flows into the gap. Since the specific gravity of the water is larger than the specific gravity of the air ar, the waterproof plastic tube 310 is easily floated when the amount of air increases, and easily sunk when the amount of air decreases. Thus the aquaculture container 600, which includes the aquaculture container cage 630 connected to the plastic tube 315, can be floated or sunk freely. That is, the aquaculture container 600 has the function of floating and sinking. The aquaculture container 600 can easily change a position in the water in the water depth direction. The double structure plastic tube 300 including the waterproof plastic tube 310 and the plastic tube 315 has high weather resistance. The aquaculture container 600 has a plastic double structure, and a certain amount of air is always stored inside the waterproof plastic tube 310, so that a buoyancy balance can be easily maintained in the double structure plastic tube 300.

The aquaculture container 600 may include the spacer 308 that supports the outer peripheral surface of the waterproof plastic tube 310 and the inner peripheral surface of the plastic tube 315 in the gap between the waterproof plastic tube 310 and the plastic tube 315.

Accordingly, space can be secured between the waterproof plastic tube 310 and the plastic tube 315, in which a desired amount of air ar or water can flow. The plastic tube 315 and the waterproof plastic tube 310 have rigid structures, and are difficult to deform even when an external force is applied. Therefore, the aquaculture container 600 can secure a substantially constant inner volume inside the double structure plastic tube 300 and easily adjust the buoyancy acting on the double structure plastic tube 300.

The adjuster 390 may include the compressor 370 that sends air to the gap between the waterproof plastic tube 310 and the plastic tube 315, and the suction pump 380 that suctions air from the gap.

Accordingly, the aquaculture container 600 can make the air ar in the gap flow in and out by a force from an external device. When the suction pump 380 is used in the aquaculture container 600, the air ar can be discharged from the gap at a high speed, as compared with the case where only the valve 375 is opened without using the suction pump 380.

The plurality of holes 315z may be disposed in a dispersed manner along the longitudinal direction of the plastic tube 315 (the direction in which the plastic tube 315 extends).

Accordingly, since the positions of the plurality of holes 315z are not irregular, the aquaculture container 600 can prevent water from easily flowing in from a part of the holes 315z, thus the strength of the plastic tube 315 can be maintained. Thus a long-term reliability of the double structure plastic tube 300 is improved.

(Aquaculture Container Including Double Structure Plastic Tube in which An Electric Power Transmission Coil is Accommodated)

Figure 7:
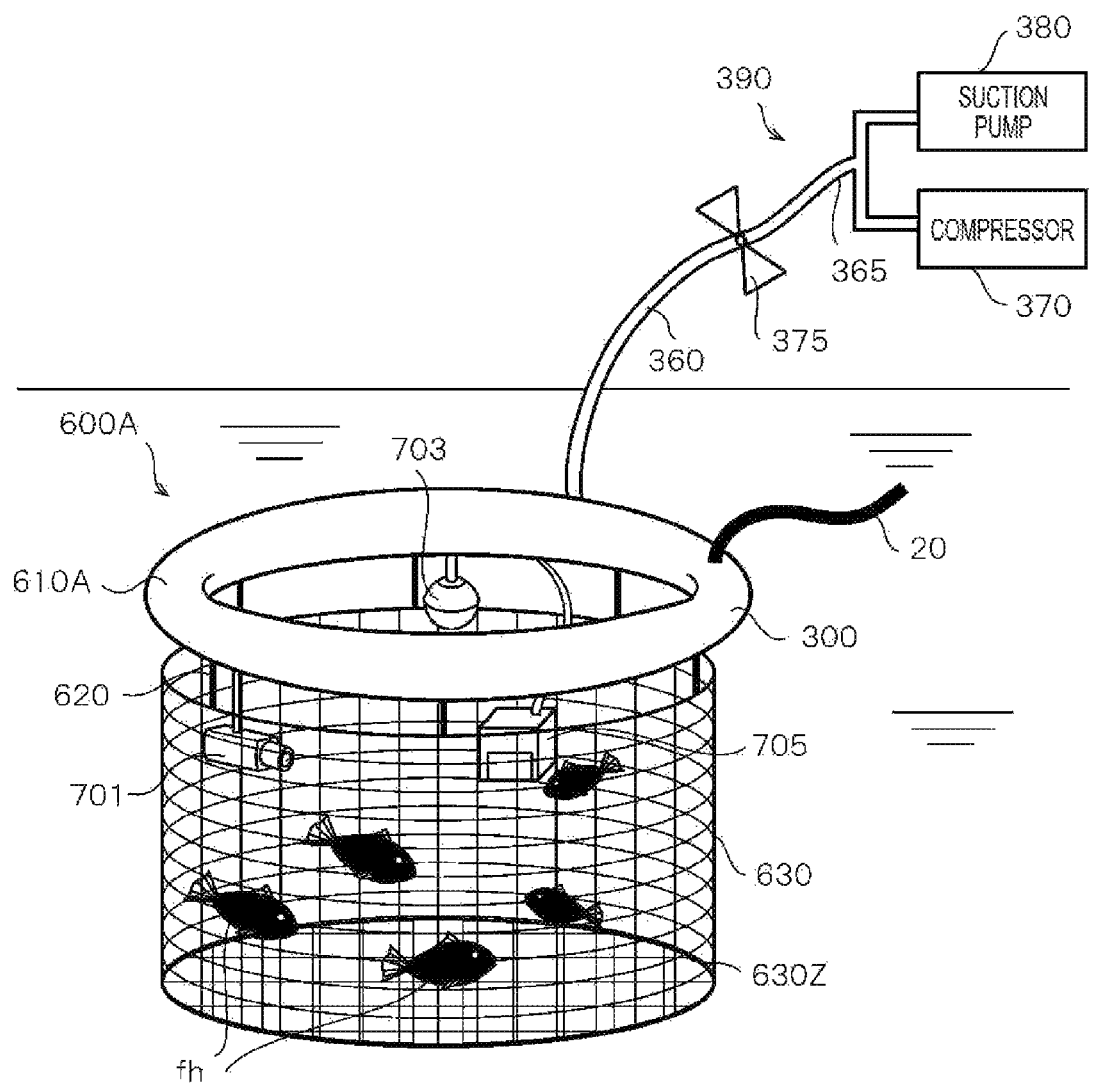
FIG. 7 is a perspective view showing an appearance of another aquaculture container according to the second embodiment.

FIG. 7 is a perspective view showing an appearance example of another aquaculture container 600A according to the second embodiment. Similarly to the aquaculture container 600, the aquaculture container 600A includes: an aquaculture container frame 610A formed in an annular shape (ring shape); and the aquaculture container cage 630 suspended by the connecting rope 620 on the aquaculture container frame 610A.

The aquaculture container frame 610A includes the double structure plastic tube 300. Since a structure of the double structure plastic tube 300 is the same as the structure of the double structure plastic tube 300 shown in the first embodiment, a detailed description thereof will be omitted or simplified. Here, the electric power transmission coil CLA is accommodated in the waterproof plastic tube 310 of the double structure plastic tube 300.

The power supply electric wire 20 for transmitting electric power to the electric power transmission coil CLA is connected to a side surface of the double structure plastic tube 300 via a resin mold or a waterproof connector. Therefore, the aquaculture container 600A can use the electric power transmission coil CLA to transmit electric power. That is, similarly to the electric power transmission device 100 of the first embodiment, the aquaculture container 600A has an electric power transmission function for transmitting electric power. The aquaculture container 600A may include at least a part of each component of the electric power transmission device 100 similar to that of the first embodiment. Although only the electric power transmission coil CLA is shown in FIG. 7, the booster coil CLC may be installed, and each coil CL may be connected by a connecting body or the like to form a coil structure body.

Meanwhile, the aquaculture container cage 630 is similar to the aquaculture container cage 630 of the aquaculture container 600 described above, and a description thereof will be omitted or simplified. An operation of adjusting the amount of air in the double structure plastic tube 300 by the adjuster 390 to float and sink the aquaculture container frame 610A, that is, an operation of floating and sinking the aquaculture container 600A, is the same as the case of the aquaculture container 600.

Various electric power reception devices 200, which are mounted with the electric power reception coils CLB capable of receiving electric power from the electric power transmission coil CLA by the magnetic resonance method and are operable with the electric power received by the electric power reception coils CLB, may be attached to the aquaculture container frame 610A. The electric power reception device 200 may be surrounded by the aquaculture container frame 610A and disposed therein without being attached to the aquaculture container frame 610A.

In FIG. 7, a camera 701, a light 703, and a feeding device 705 are attached to the aquaculture container frame 610A as examples of the electric power reception devices 200.

The camera 701 images fish farmed in the aquaculture container 600A, the net 630Z of the aquaculture container cage 630, and the like. A captured image may be transmitted via the electric power reception coil CLB and the electric power transmission coil CLA to the watercraft 50 or an onshore device so as to be displayed. Accordingly, a user can see the image captured by the camera 701 and observe growth of fish or the like. The user can grasp a state of the net 630Z and determine necessity of maintenance.

The light 703 illuminates inside of the aquaculture container cage 630. During night or in deep water, external light does not reach the inside of the aquaculture container cage 630, thus the inside may become dark. In the aquaculture container 600A, the inside of the aquaculture container cage 630 can be easily observed due to illumination of the light 703. The light 703 may illuminate with infrared light that is not sensed by the fish or the like so that the light from the light 703 does not stress the fish or the like. Using habits of the fish, the fish may be easily gathered by illumination of the light 703 at the time of feeding.

The feeding device 705 feeds food to aquatic products such as fish. The feeding device 705 is operated by supplied electric power, so as to open a door during feeding time and scatters the food in the sea in the aquaculture container cage 630. The food may be solid food, or may be living food, such as shrimps or sardines. When the food is solid food, the feeding device 705 may be placed on the sea or in the sea, and a certain amount of food may be scattered in the sea at predetermined time. When the food is living food, the feeding device 705 is placed in the sea. The feeding device 705 may include space for raising the living food and the living food may be provided by opening the space to the aquaculture container cage 630 during the feeding time. For example, in a case of farming skipjack tuna, sardines serving as the food may be raised in the aquaculture container cage 630 in separate space. The feeding device 705 may electrically open and close a gate that divides the aquaculture container cage into two pieces of space. When the gate is opened, a passage may be formed in one direction from a sardine side toward a skipjack tuna side.

The electric power reception device 200 (for example, the camera 701, the light 703, and the feeding device 705) is supplied with electric power from the electric power transmission device 100 installed in the watercraft 50 or the like on the sea, and operates with the electric power transmitted by the electric power transmission coil CLA accommodated in the aquaculture container frame 610A. Accordingly, since the electric power reception device 200 does not necessarily include a power supply, the electric power reception device 200 can be simplified and reduced in weight.

It should be noted that the electric power reception devices 200 may be attached not only to the aquaculture container frame 610A but also to an upper surface, a side surface, and a bottom surface of the aquaculture container cage 630. The electric power reception device 200 is not limited to the above three examples, and various devices may be used.

The plastic tube accommodating the booster coil CLC may be installed in multiple stages, and the aquaculture container cage 630 may be suspended by the connecting rope 335 on the plastic tube at a deepest position in the water depth direction. In this case, the aquaculture container cage 630 can be installed at a deep position in the water which is away from the aquaculture container frame 610A in which the coil CL is accommodated. The aquaculture container 600A can transmit electric power to the electric power reception device 200 operating in the aquaculture container cage 630 even when the aquaculture container cage 630 moves away from the aquaculture container frame 610A.

As described above, the other aquaculture container 600A according to the second embodiment includes: the electric power transmission coil CLA configured to transmit electric power via the magnetic field; the driver 151 that transmits AC power to the electric power transmission coil CLA; and the capacitor CA that is connected with the electric power transmission coil CLA and forms the resonance circuit 152 that resonates with the electric power transmission coil CLA. A waterproof plastic tube 510 seals the periphery of the electric power transmission coil CLA. The electric power transmission coil CLA is an example of the transmission coil. The driver 151 is an example of an electric power transmitter.

Accordingly, the electric power transmission coil CLA and the capacitor CA form the resonance circuit 152 in the aquaculture container 600A, and the electric power can be transmitted via the magnetic field. The aquaculture container 600A can supply electric power to a device used for farming fish that requires electric power (an example of the electric power reception device 200) in the aquaculture container 600A. The device that requires the electric power may include, for example, the camera 701 configured to monitor a state of the fish in the aquaculture container 600A, the feeding device 705 that automatically supplies food to the fish in the aquaculture container 600A, and other devices. Since the waterproof plastic tube 510 is waterproof, the aquaculture container 600A can prevent the electric power transmission coil CLA accommodated in the waterproof plastic tube 510 from contacting the water even if the water flows into the gap. Therefore, the aquaculture container 600A can prevent the electric power transmission coil CLA from being short-circuited, and can use the electric power transmission coil CLA to transmit electric power in the water. The waterproof plastic tube 510 may include the coil CL other than the electric power transmission coil CLA therein.

The electric power transmission coil CLA may transmit electric power in the direction substantially orthogonal to the water surface.

Accordingly, the electric power transmission device 100 that includes the electric power transmission coil CLA can extend the electric power transmission distance in the water depth direction, and can supply electric power to the electric power reception device 200 positioned at a location that is deep in the water (for example, deep sea), thereby improving the operation efficiency of the electric power reception device 200.

The electric power transmission coil CLA may transmit electric power and perform data communication.

Accordingly, the electric power reception device 200 can perform communication of, for example, various types of data (for example, the captured image of the camera 701) while receiving power supply.

Third Embodiment

In the first embodiment, the buoyancy acting on the coil structure body is increased or decreased by adjusting the amount of air in the double structure plastic tube that accommodates the electric power transmission coil. In a third embodiment, it is assumed that a float is attached to the waterproof plastic tube that accommodates the electric power transmission coil CLA, and the buoyancy acting on the coil structure body is increased or decreased by adjusting an amount of air in the float.

The electric power transmission system 10 of the third embodiment has substantially the same configuration as the first embodiment. The same components as those of the first embodiment are denoted by the same reference numerals, and the description thereof will be omitted or simplified.

Figure 8:
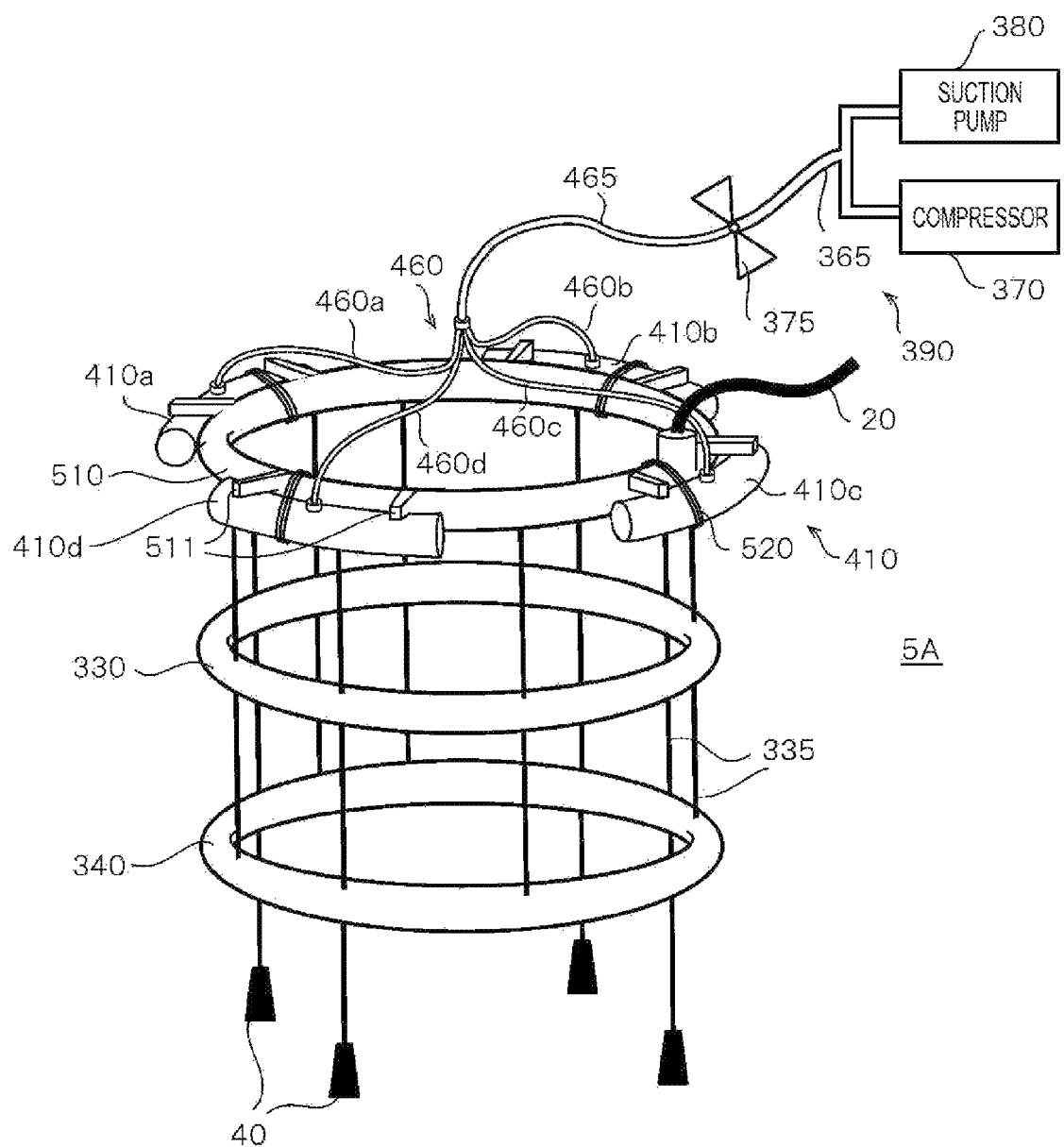
FIG. 8 is a perspective view showing a first appearance example of a coil structure body in a third embodiment.

FIG. 8 is a perspective view showing a first appearance example of a coil structure body 5A in the third embodiment. In the first appearance example, an amount of air in a float 410 is relatively large, and the coil structure body 5A is easily floated in the sea or on the sea surface.

The coil structure body 5A includes the plurality of plastic tubes connected in series by the plurality of (for example, eight) connecting ropes 335. Each of the plurality of plastic tubes encloses each of the plurality of coils CL and the inside of the tubes is sealed. The plurality of coils CL may include the electric power transmission coil CLA and may include the booster coil CLC. The plastic tube may include a plurality of waterproof plastic tubes 510, 330, and 340.

The waterproof plastic tube 510 may be formed in an annular shape and accommodate the electric power transmission coil CLA (electric power supply coil) therein. The waterproof plastic tubes 330, 340 may be formed in annular shapes, and may accommodate the booster coil CLC in each tube. The number of the waterproof plastic tubes that accommodate the booster coils CLC is not limited to two, and may be any number.

The weight 40 may be attached to each lower end of at least a part (for example, four) of the connecting ropes 335 among the plurality of (for example, eight) connecting ropes 335, so that the coil structure body 5 can stably maintain a position in the vertical direction in the water. The upper ends of the connecting ropes 335 may be fixed to the waterproof plastic tube 510 at regular intervals.

A plurality of (for example, four) floats 410 (410a, 410b, 410c, 410d) are disposed on an outer periphery of the waterproof plastic tube 510. When the plurality of floats 410a, 410b, 410c, and 410d are not particularly distinguished, the plurality of floats 410a, 410b, 410c, and 410d are also referred to as the floats 410. The plurality of floats 410 may be arranged at equal intervals along the outer periphery of the waterproof plastic tube 510. The number of floats is not limited to four, and may be any number (for example, two, three, five or more).

The float 410 may have a substantially cylindrical shape, which is similar to a shape of a portion of a ring. A sealed space, in which air can be put in and taken out, is formed inside the float 410. The float 410 is waterproof and deforms in accordance with an amount of air inside the float. The float 410 may be made of, for example, an elastic rubber member. A material of the float 410 is not limited to the rubber member, and may be any material as long as the material can form the sealed space and freely expand and contract this space, for example, a waterproof sheet (a metal sheet, or a plastic sheet made of polyethylene resin, urethane resin, polypropylene resin and the like).

A plurality of (for example, four) suction and discharge tubes 460a to 460d that respectively communicate with inside of the plurality of floats 410a to 410d are attached to upper surfaces of the plurality of floats 410a to 410d. The plurality of suction and discharge tubes 460a to 460d are connected to one suction and discharge tube 465 connected to the valve 375 of the adjuster 390. The compressor 370 and the suction pump 380 may be attached to the bifurcated tube 365 to which the suction and discharge tube 465 is connected via the valve 375.

Protrusions 511 are formed on an outer peripheral surface of the waterproof plastic tube 510 in a manner of protruding toward the respective floats 410a to 410d, the outer peripheral surface being in contact with the respective floats 410a to 410d. For example, in a case where the number of the floats is four, eight protrusions 511 may be disposed on the outer peripheral surface of the waterproof plastic tube 510. The float 410 is locked by two protrusions 511 and is restricted from moving upward (in a direction perpendicular to the water surface toward the water surface). The float 410 may be bound by a wound binding rope 520 so as to be integrated with the waterproof plastic tube 510. Therefore, due to the protrusions 511 and the binding rope 520, the float 410 is kept adjacent to the outer peripheral surface of the waterproof plastic tube 510 without being separated from the waterproof plastic tube 510, even when air inside the float 410 flows out and a shape of the float 410 becomes close to a flat surface.

When the floats 410a to 410d are arranged at equal intervals on the outer peripheral surface of the waterproof plastic tube 510, a balance of forces applied along the water depth direction (for example, gravity and buoyancy) of the coil structure body 5A is improved. Therefore, a posture in a horizontal direction in the sea (direction along the water surface) is stabilized.

When air flows into and out of each of the floats 410a to 410d, the compressor 370 or the suction pump 380 simultaneously sends, by the same amount, air to each of the floats 410a to 410d, or simultaneously suctions, by the same amount, air from each of the floats 410a to 410d, so that buoyancy applied to each of the floats 410a to 410d can be made uniform. In this case, as compared with a case where air is put into or taken out from one float connected to the waterproof plastic tube 510, the waterproof plastic tube 510 is difficult to be inclined with respect to the horizontal direction in the vicinity of each float 410a, and the posture of the waterproof plastic tube 510 in the horizontal direction is stabilized, thus the posture of the coil structure body 5A in the horizontal direction is stabilized.

FIG. 8 shows the shape of the float 410 when an amount of air flowing into the float 410 is relatively large. In FIG. 8, the float 410 is filled with air and is in an expanded state. For example, magnitude of the buoyancy is determined by a volume of the air (air amount) inside the float 410. The coil structure body 5A is stopped at a position where an upward force (force toward the sea surface) including the buoyancy acting on the floats 410a to 410d and a downward gravity (force toward the sea bottom) applied to the coil structure body 5A are balanced. When the waterproof plastic tube 510 of the coil structure body 5A is floated on the sea surface, the inside of the four floats 410a to 410d may be filled with air.

Figure 9:
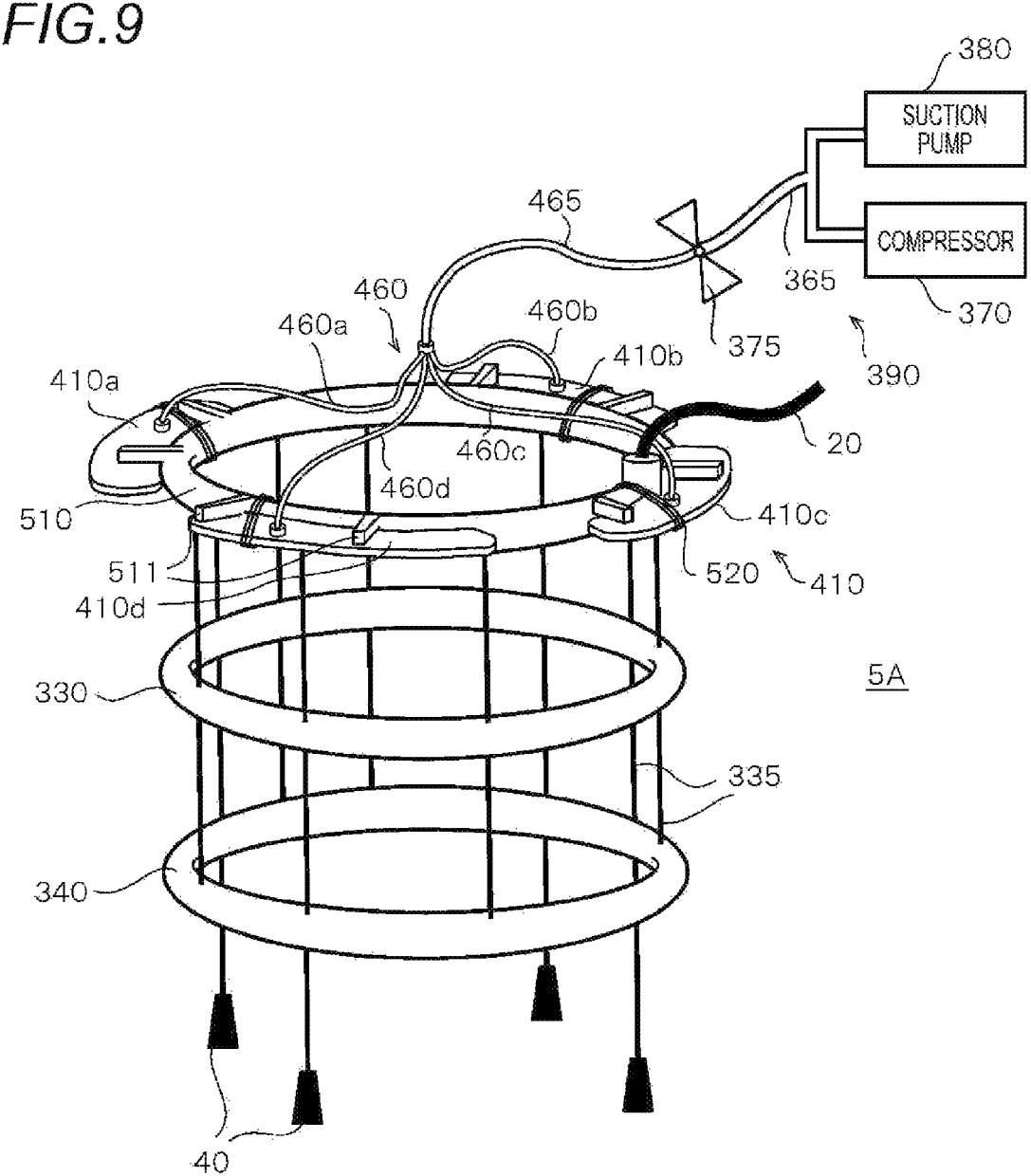
FIG. 9 is a perspective view showing a second appearance example of the coil structure body in the third embodiment.

FIG. 9 is a perspective view showing a second appearance example of the coil structure body 5A. In the second appearance example, the amount of air in the float 410 is relatively small, and the coil structure body 5A is easily sunk on the sea bottom or on the sea surface.

When the coil structure body 5A is sunk in the sea, the float 410 is in a deflated state with almost no air inside. Compared to FIG. 8, the float 410 is deformed into a substantially flat plate shape in FIG. 9. In this state, almost no buoyancy acts on the float 410. An extent of sinking of the coil structure body 5A can be changed by adjusting the amount of air inside the float 410.

For example, the magnitude of the buoyancy is determined according to the volume of the air (air amount) inside the float 410. The coil structure body 5A is stopped at a position where the upward buoyancy (force toward the sea surface), acting on the coil structure body 5A including the floats 410a to 410d, and the downward gravity (force toward the sea bottom) applied to the coil structure body 5A are balanced. It should be noted that the inside of the four floats 410a to 410d may have no air at all when the coil structure body 5A is sunk to the sea bottom.

Figure 10A:
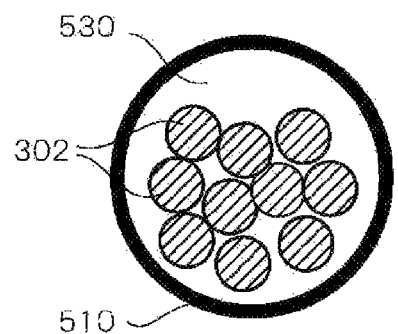
FIG. 10A is a vertical cross-sectional view showing a structure of a plastic tube.
Figure 10B:
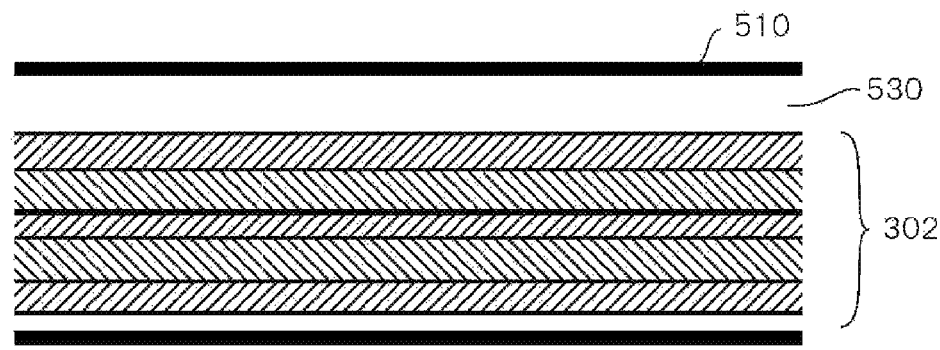
FIG. 10B is a horizontal cross-sectional view showing the structure of the plastic tube.

FIG. 10A is a vertical cross-sectional view showing a structure example of the waterproof plastic tube 510. FIG. 10B is a horizontal cross-sectional view showing the structure example of the waterproof plastic tube 510.

The waterproof plastic tube 510 accommodates a plurality of coil electric wires 302 therein. The tube of the waterproof plastic tube 510 is filled with filler 530, so that the coil electric wires 302 are enclosed therein. The filler 530 may be any insulating substance having a lower specific gravity than the specific gravity of the sea water ow. For example, the filler 530 may be air, oil, or any other liquid or gas. A specific gravity of the oil is larger than the specific gravity of the air and smaller than the specific gravity of the sea water. Accordingly, since the buoyancy is also applied to the waterproof plastic tube 510, the coil structure body 5A is easily floated. When oil is filled in the waterproof plastic tube 510, the coil electric wire 302 (that is, the coil CL) is difficult to be corroded, and a service life of the coil electric wire 302 is increased.

It should be noted that the buoyancy of the waterproof plastic tube 510 is easier to become appropriate when the waterproof plastic tube 510 is filled with oil, as compared with a case where the waterproof plastic tube 510 is filled with air. Strength of the waterproof plastic tube 510, with respect to an external force, is increased when liquid is filled, as compared with a case where gas is filled. Therefore, for example, when the coil structure body 5A is disposed at a deep location in the water with a high water pressure, the waterproof plastic tube 510 is preferably filled with liquid (for example, oil).

As described above, in the electric power transmission system 10 according to the third embodiment, the electric power transmission device 100 transmits electric power to the electric power reception device 200 including the electric power reception coil CLB in the water (for example, in the sea). The electric power transmission device 100 includes: one or more coils CL including the electric power transmission coil CLA that transmits electric power to the electric power reception coil CLB via the magnetic field; the driver 151 that transmits AC power to the electric power transmission coil CLA; and the capacitor CA that is connected with the electric power transmission coil CLA and forms the resonance circuit 152 that resonates with the electric power transmission coil CLA. The electric power transmission device 100 includes: the waterproof plastic tube 510 which is waterproof and seals the periphery of the coil CL; the float 410, which is attached to the waterproof plastic tube 510, and is capable of suctioning air to the inside; and the adjuster 390 that adjusts the amount of the air suctioned into the float 410. The waterproof plastic tube 510 is an example of the tubular member. The float 410 is an example of an accommodating body.

Since the specific gravity of the water is larger than the specific gravity of the air ar, the coil CL is easily floated when the amount of air in the float 410 increases, and the coil CL is easily sunk when the amount of air in the float 410 decreases. Therefore, the coil CL can be freely floated or sunk. That is, the coil structure body 5A which includes the plurality of coils CL has the function of floating and sinking. Since the waterproof plastic tube 510 is waterproof, the electric power transmission device 100 can prevent the coil CL from contacting the water. Therefore, the coil CL can be prevented from being short-circuited, and the coil CL can be used to transmit electric power in the water. In this way, the electric power transmission device 100 can easily change an arrangement position, in the water depth direction, of the coil CL which is configured to transmit electric power in the water.

The plurality of floats 410a to 410d may be arranged at equal intervals along the waterproof plastic tube 510.

Accordingly, a balance of a force for floating the waterproof plastic tube 510 or a force for sinking the waterproof plastic tube 510 is improved. Therefore, the waterproof plastic tube 510 is difficult to be inclined with respect to the water surface, and the electric power transmission device 100 can inhibit reduction in an amount of magnetic flux passing through the coil CL included in the waterproof plastic tube 510, thus the reduction in the electric power transmission efficiency can be inhibited.

Three or more floats 410 may be provided.

Accordingly, three or more floats 410 having the same weight can be arranged along the waterproof plastic tube 510. Therefore, as compared with a case where the number of the floats is two, a posture of the waterproof plastic tube 510 and the posture of the coil structure body 5 are further stabilized.

The adjuster 390 may adjust the amounts of air stored in the plurality of floats 410 simultaneously by the same amount.

Accordingly, for example, the electric power transmission device 100 can put the air ar into each float 410 by the same amount, or take the air ar out from each float 410 by the same amount. Therefore, due to a variation in the buoyancy acting on each float 410 when the air amount is adjusted, the electric power transmission device 100 can inhibit inclination of the waterproof plastic tube 510 to which the floats 410 are connected.

The waterproof plastic tube 510 may seal the periphery of the electric power transmission coil CLA arranged at a position closest to the water surface among the plurality of coils CL arranged side by side in the water depth direction.

Accordingly, the electric power transmission device 100 adjusts the position of the electric power transmission coil CLA closest to the water surface in the water depth direction, thereby facilitating adjustment of a position of the entire coil structure body 5A. The floats 410 are disposed at one location (one waterproof plastic tube), so that the coil structure body 5A can realize the floating and sinking function with a simple configuration. A state of the float 410 can be easily confirmed from above the water.

The adjuster 390 may include the compressor 370 that sends air to the float 410, and the suction pump 380 that suctions air from the float 410.

Accordingly, the electric power transmission device 100 can make the air ar stored in the float 410 flow in and out by a force from an external device. When the suction pump 380 is used in the electric power transmission device 100, the air can be discharged from the float 410 at a high speed, as compared with a case where only the valve 375 is opened without using the suction pump 380.

Fourth Embodiment (Aquaculture Container Including Float Connected to Plastic Tube in which No Electric Power Transmission Coil is Accommodated)

As described in the second embodiment, although various fish and the like are farmed in the aquaculture container, the suitable environments are different depending on the types of the fish and the like. For example, some types of fish and the like are suitable for farming at a relatively shallow position in the water depth direction, while some types of fish and the like are suitable for farming at a relatively deep position in the water depth direction. For this reason, a position of the aquaculture container in the water depth direction is preferably variable.

The present disclosure of a fourth embodiment relates to an aquaculture container configured to farm fish in water, and provides an aquaculture container capable of changing positions in the water depth direction.

An aspect of the disclosure according to the fourth embodiment is an aquaculture container configured to farm fish in water. The aquaculture container includes: a main body portion, configured to surround fish in the water; a tubular member, which is connected to the main body portion and is waterproof, the inside of the tubular member being sealed; an accommodating body, which is connected to the tubular member and accommodates air; and an adjuster, configured to adjust an amount of air accommodated in the accommodating body.

According to the disclosure of the fourth embodiment, the aquaculture container capable of changing the positions in the water depth direction can be provided.

Figure 11:
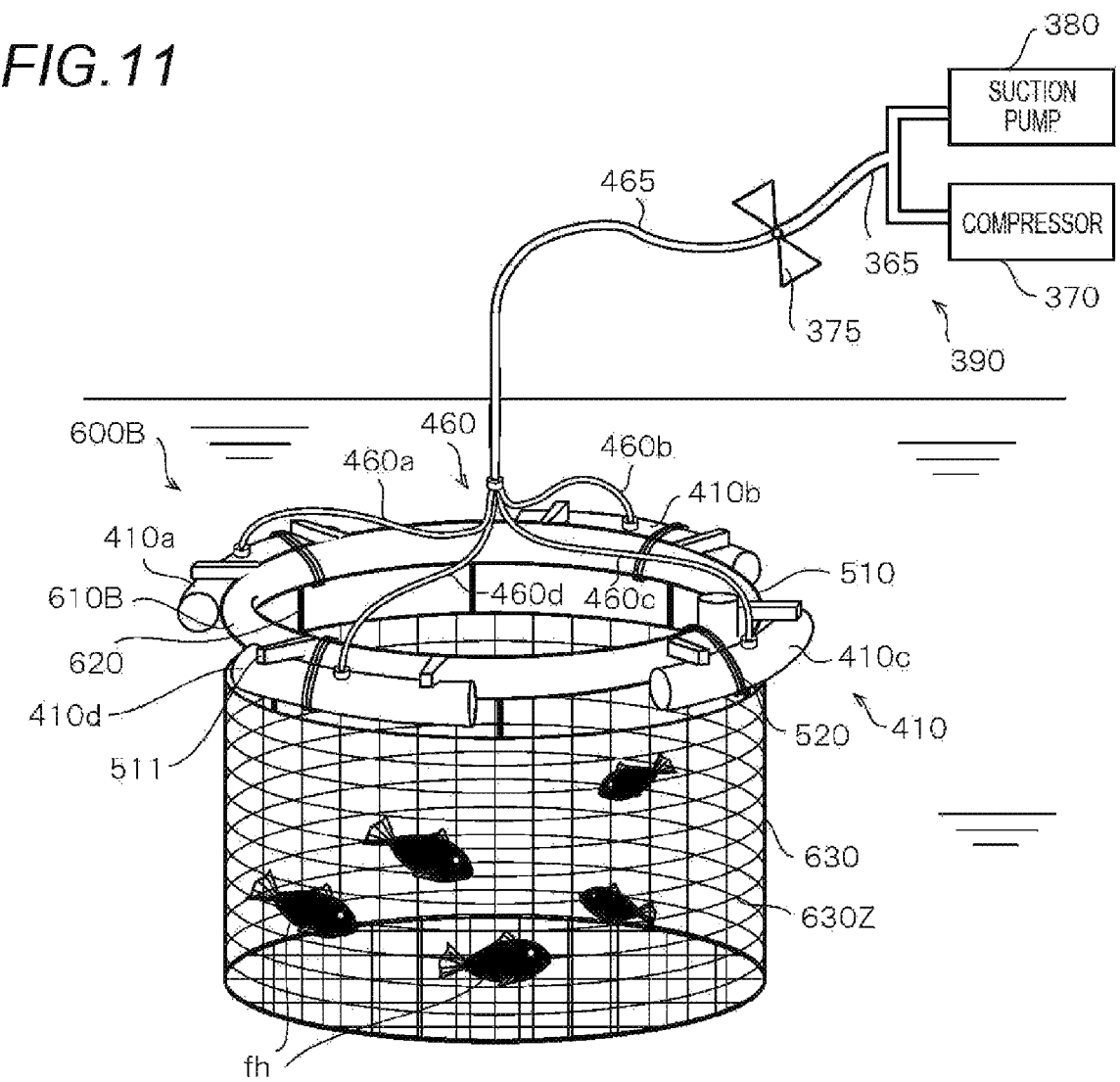
FIG. 11 is a perspective view showing a first appearance example of an aquaculture container in a fourth embodiment.

FIG. 11 is a perspective view showing a first appearance example of an aquaculture container 600B in the fourth embodiment. In the first appearance example, an amount of air in the float 410 is relatively large, and the aquaculture container 600B is easily floated in the sea or on the sea surface. Since a structure and arrangement of the float 410 are the same as those in the third embodiment, the description thereof will be omitted or simplified.

The same members as those of the third embodiment are denoted by the same reference numerals, and the description thereof will be omitted or simplified. The aquaculture container 600B includes: an aquaculture container frame 610B formed in an annular shape (for example, a ring shape); and the aquaculture container cage 630 suspended by the connecting rope 620 on the aquaculture container frame 610B.

The aquaculture container frame 610B includes the waterproof plastic tube 510. Since a structure of the waterproof plastic tube 510 is the same as the structure of the waterproof plastic tube 510 shown in the third embodiment, a detailed description thereof will be omitted or simplified. The waterproof plastic tube 510 is, for example, connected to the aquaculture container cage 630, and is waterproof, with the inside of the waterproof plastic tube 510 being sealed. Here, the electric power transmission coil CLA is not accommodated in the waterproof plastic tube 510.

Although a case in which the waterproof plastic tube 510 is used is exemplified, a plastic tube which is not waterproof or a plastic tube whose inside is not sealed may also be used since no electric wire is accommodated in the tube.

The plurality of (for example, four) floats 410 (410a, 410b, 410c, 410d) are disposed on an outer periphery of the aquaculture container frame 610B at equiangular intervals. The plurality of (for example, four) suction and discharge tubes 460a to 460d that respectively communicate with the inside of the floats 410a to 410d are attached to one place on the upper surfaces of the plurality of floats 410a to 410d. The plurality of suction and discharge tubes 460a to 460d are connected to one suction and discharge tube 465 connected to the valve 375 of the adjuster 390 shown in the third embodiment. The compressor 370 and the suction pump 380 are connected to the bifurcated tube 365 to which the suction and discharge tube 465 is connected via the valve 375. In this way, as in the third embodiment, the aquaculture container 600B includes the adjuster 390 that can adjust the amount of air inside the float 410. Meanwhile, the aquaculture container cage 630 may be the same as in the second embodiment, and may have a structure in which a net is stretched in a cylindrically formed frame body. An operation of the adjuster 390 is the same as the operation in the third embodiment.

FIG. 11 shows the shape of the float 410 when an amount of air flowing into the float 410 is relatively large. In FIG. 11, the float 410 is filled with air and is in an expanded state. For example, magnitude of the buoyancy is determined by a volume of the air (air amount) inside the float 410. The aquaculture container 600B is stopped at a position where an upward force (force toward the sea surface) including the buoyancy acting on the floats 410a to 410d and a downward gravity (force toward the sea bottom) applied to the aquaculture container 600B are balanced. At this time, in order to maintain the desired water depth, the aquaculture container 600B may be anchored with heavy stones connected to the aquaculture container cage 630. Accordingly, the aquaculture container 600B can be maintained at a water depth suitable for fish farming so as to perform farming.

When each float 410a to 410d of the aquaculture container 600B is floated on the sea surface, the inside of each float 410a to 410d may be filled with air.

Figure 12:
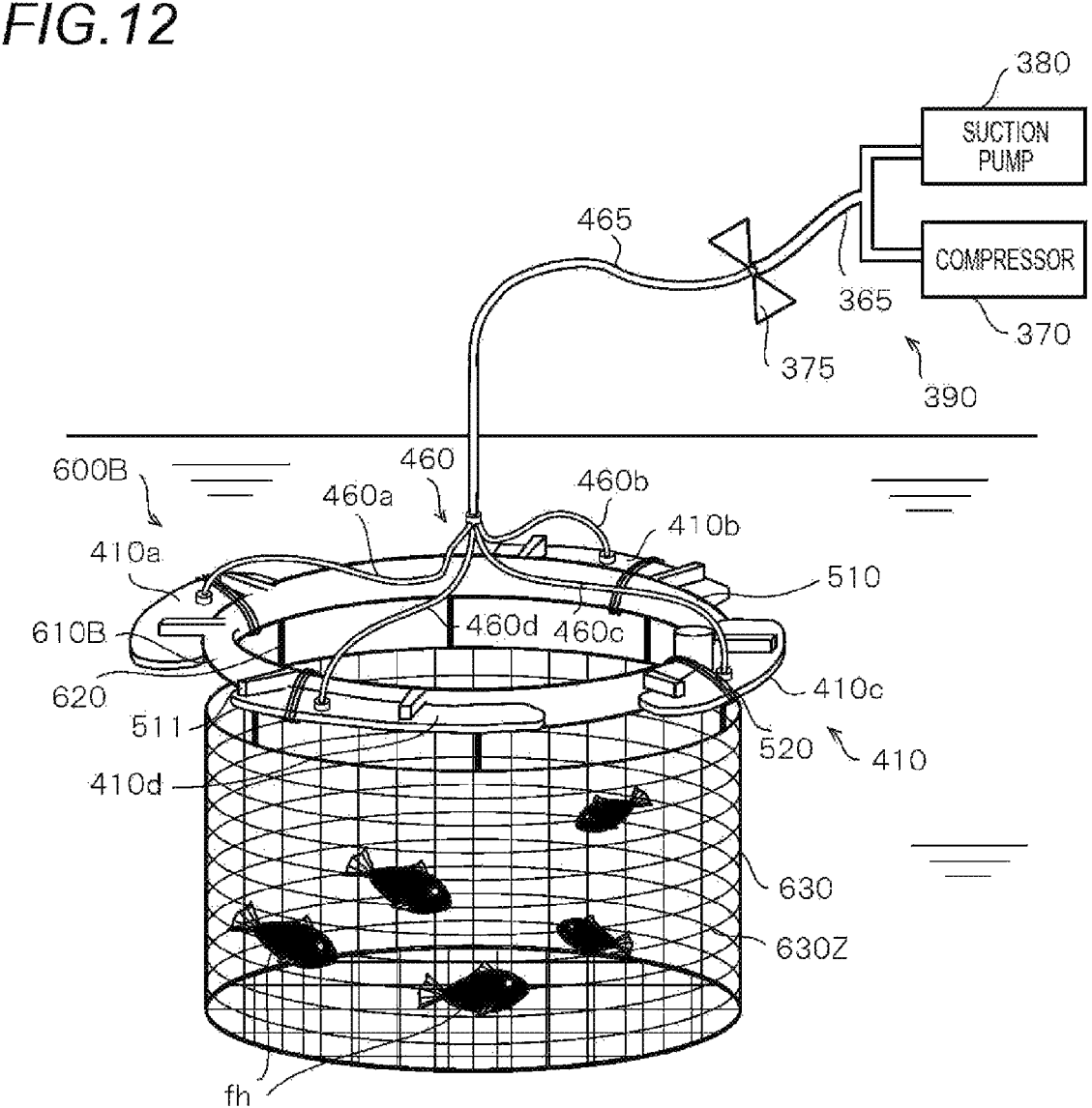
FIG. 12 is a perspective view showing a second appearance example of the aquaculture container in the fourth embodiment.

FIG. 12 is a perspective view showing a second appearance example of the aquaculture container 600B. In the second appearance example, the amount of air in the float 410 is relatively small, and the aquaculture container 600B is easily sunk on the sea bottom or on the sea surface.

When the aquaculture container 600B is sunk in the sea, the float 410 is in a deflated state with almost no air inside. Compared to FIG. 11, the float 410 is deformed into a substantially flat plate shape in FIG. 12. In this state, almost no buoyancy acts on the float 410. An extent of sinking of the aquaculture container 600B can be changed by adjusting the amount of air inside the float 410.

As in the third embodiment, the magnitude of the buoyancy of the float 410 is determined by the volume of the air inside the float 410. The aquaculture container 600B is stopped at a position where the upward buoyancy acting on the aquaculture container 600B including the floats 410a to 410d, and the downward gravity applied to the aquaculture container 600B are balanced. It should be noted that the inside of the four floats 410a to 410d may have no air at all when the aquaculture container 600B is completely sunk to the sea bottom.

As described above, the aquaculture container 600B in the fourth embodiment is an aquaculture container configured to farm fish in the sea water (for example, in the water). The aquaculture container 600B includes: the aquaculture container cage 630, configured to surround fish in the water; the waterproof plastic tube 510, which is connected to the aquaculture container cage 630 and is waterproof, the inside of the waterproof plastic tube 510 being sealed; the float 410, which is connected to the waterproof plastic tube 510 and accommodates air; and the adjuster 390, configured to adjust an amount of air accommodated in the float 410.

Since the specific gravity of the water is larger than the specific gravity of the air ar, the float 410 floats easily when the amount of air increases in the float 410. When the amount of air decreases in the float 410, the float 410 sinks easily. Therefore, the aquaculture container cage 630, which is connected to the aquaculture container frame 610 to which the float 410 is connected, can be freely floated or sunk. An aquaculture container 600B containing the aquaculture container cage 630 has the function of floating and sinking. In this way, the aquaculture container 600B can easily change a position in the water in the water depth direction.

The plurality of floats 410a to 410d may be arranged at equal intervals along the aquaculture container frame 610B.

Accordingly, a balance of a force for floating the aquaculture container frame 610B or a force for sinking the aquaculture container frame 610B is improved, thus a posture of the aquaculture container 600B is stabilized in the water.

Three or more floats 410 may be provided.

Accordingly, three or more floats 410, whose weight can be adjusted to be the same, can be arranged along the aquaculture container frame 610B. Therefore, as compared with a case where the number of the floats 410 is two, since buoyancy is dispersed along the aquaculture container frame 610B, a posture of the aquaculture container frame 610B and the posture of the aquaculture container 600B are further stabilized.

The adjuster 390 may adjust the amounts of air ar stored in the plurality of floats 410 simultaneously by the same amount.

Accordingly, the aquaculture container 600B can put the air ar into each float 410 by the same amount, or take the air ar out from each float 410 by the same amount. Therefore, due to a variation in the buoyancy acting on each float 410 when the air amount is adjusted, the aquaculture container 600B can inhibit inclination of the aquaculture container frame 610B to which the floats 410 are connected.

The adjuster 390 may include the compressor 370 that sends the air ar to the float 410, and the suction pump 380 that suctions the air ar from the float 410.

Accordingly, the aquaculture container 600B can make the air ar stored in the float 410 flow in and out by a force from an external device. When the suction pump 380 is used in the aquaculture container 600B, the air ar can be discharged from the float 410 at a high speed, as compared with a case where only the valve 375 is opened without using the suction pump 380.

(Aquaculture Container Including Float Connected to Plastic Tube in which Electric Power Transmission Coil is Accommodated)

Figure 13:
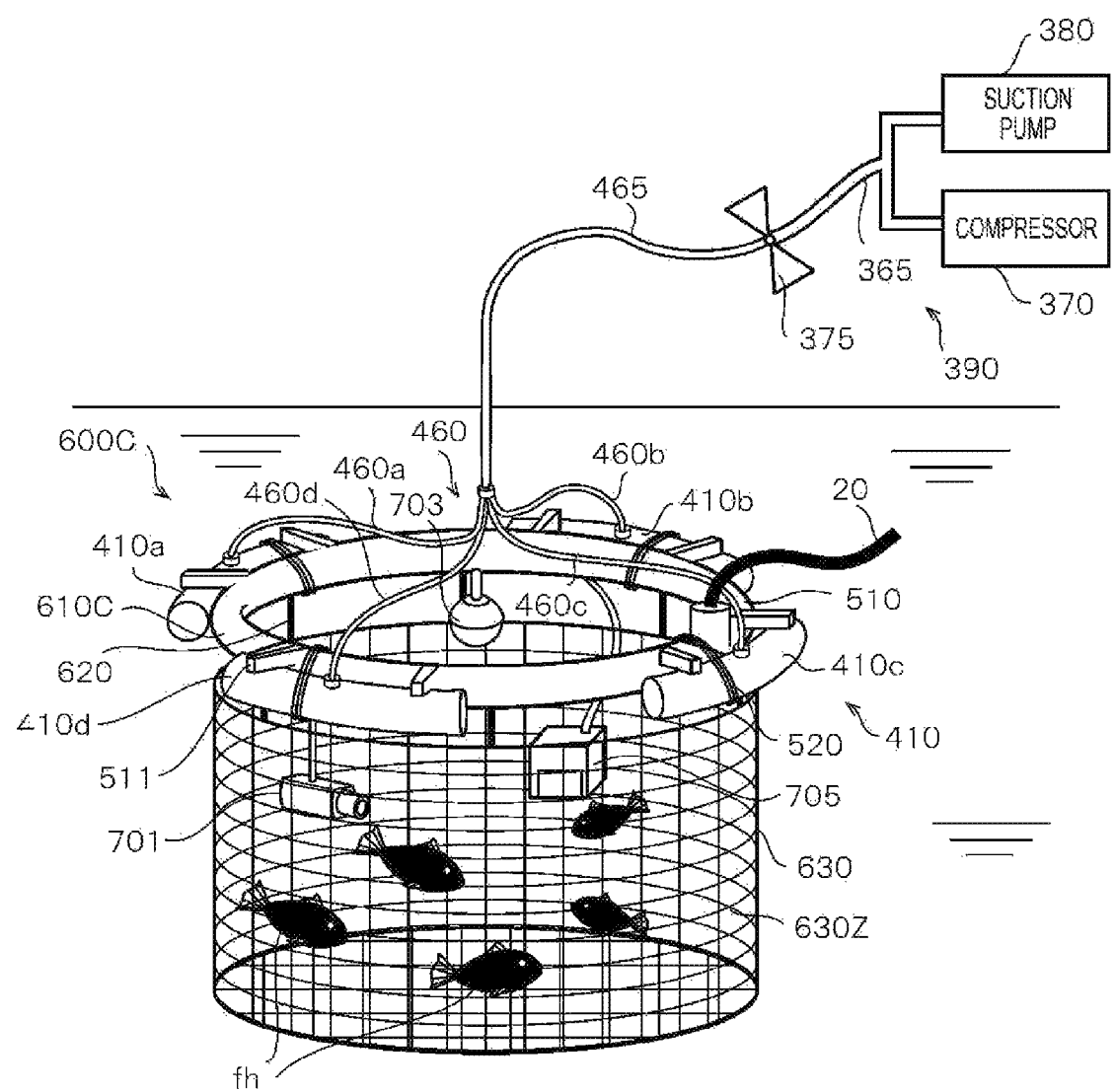
FIG. 13 is a perspective view showing an appearance of another aquaculture container according to the fourth embodiment.

FIG. 13 is a perspective view showing an appearance example of another aquaculture container 600C according to the fourth embodiment. Similarly to the aquaculture container 600B, the aquaculture container 600C includes: an aquaculture container frame 610C formed in an annular shape (ring shape); and the aquaculture container cage 630 suspended by the connecting rope 620 on the aquaculture container frame 610C.

The aquaculture container frame 610C includes the waterproof plastic tube 510. Since a structure of the waterproof plastic tube 510 is the same as the structure of the waterproof plastic tube 510 shown in the third embodiment, a detailed description thereof will be omitted or simplified. Here, the electric power transmission coil CLA is accommodated in the waterproof plastic tube 510.

The power supply electric wire 20 for transmitting electric power to the electric power transmission coil CLA is connected to a side surface of the waterproof plastic tube 510 via a resin mold or a waterproof connector. Therefore, electric power can be transmitted to the electric power transmission coil CLA. That is, similarly to the electric power transmission device 100 of the third embodiment, the aquaculture container 600C has an electric power transmission function for transmitting electric power. Although only the electric power transmission coil CLA is shown in FIG. 13, the booster coil CLC may be installed, and each coil CL may be connected by a connecting body or the like to form a coil structure body.

Meanwhile, the aquaculture container cage 630 is similar to the aquaculture container cage 630 of the aquaculture container 600B described above, and a description thereof will be omitted or simplified. An operation of adjusting the amount of air inside the float 410 by the adjuster 390 to float and sink the aquaculture container frame 610C, that is, an operation of floating and sinking the aquaculture container 600C, is the same as the case of the aquaculture container 600B.

Various electric power reception devices 200, which are mounted with the electric power reception coils CLB capable of receiving electric power from the electric power transmission coil CLA by the magnetic resonance method and are operable with the electric power received by the electric power reception coils CLB, may be attached to the aquaculture container frame 610C. The electric power reception device 200 may be surrounded by the aquaculture container frame 610C and disposed therein without being attached to the aquaculture container frame 610C.

In FIG. 13, similarly to the second embodiment, the camera 701, the light 703, and the feeding device 705 are attached to the aquaculture container frame 610C as examples of the electric power reception devices 200. Since operations of the camera 701, the light 703, and the feeding device 705 are the same as in the second embodiment, a description thereof will be omitted.

In this way, the electric power reception device 200 (for example, the camera 701, the light 703, and the feeding device 705) is supplied with electric power from the electric power transmission device 100 installed in the watercraft 50 or the like on the sea, and operates with the electric power transmitted by the electric power transmission coil CLA accommodated in the aquaculture container frame 610C. Accordingly, since the electric power reception device 200 does not necessarily include a power supply, the electric power reception device 200 can be simplified and reduced in weight. As in the second embodiment, various devices may be connected as the electric power reception device 200.

It should be noted that the plastic tube accommodating the booster coil CLC may be installed in multiple stages, and the aquaculture container cage 630 may be suspended by the connecting rope 335 on the plastic tube at a deepest position in the water depth direction. In this case, the aquaculture container cage 630 can be installed at a deep position in the water which is away from the aquaculture container frame 610C in which the coil CL is accommodated. The aquaculture container 600C can transmit electric power to the electric power reception device 200 operating in the aquaculture container cage 630 even when the aquaculture container cage 630 moves away from the aquaculture container frame 610C.

As described above, the other aquaculture container 600C according to the fourth embodiment includes: the electric power transmission coil CLA configured to transmit electric power via the magnetic field; the driver 151 that transmits AC power to the electric power transmission coil CLA; and the capacitor CA that is connected with the electric power transmission coil CLA and forms the resonance circuit 152 that resonates with the electric power transmission coil CLA. The waterproof plastic tube 510 of the aquaculture container frame 610C seals the periphery of the electric power transmission coil CLA.

Accordingly, the electric power transmission coil CLA and a capacitor CA form the resonance circuit 152 in the aquaculture container 600C, and the electric power can be transmitted via the magnetic field. Thus the aquaculture container 600C can supply electric power to a device used for farming fish that requires electric power in the aquaculture container 600C. Since the waterproof plastic tube 510 is waterproof, the electric power transmission coil CLA accommodated in the waterproof plastic tube 510 can be prevented from contacting the water. Therefore, the electric power transmission coil CLA can be prevented from being short-circuited, thus the electric power transmission coil CLA can be used to transmit electric power in the water. The waterproof plastic tube 510 may include the coil CL other than the electric power transmission coil CLA therein.

The plurality of floats 410a to 410d may be arranged at equal intervals along the waterproof plastic tube 510.

Accordingly, a balance of a force for floating the aquaculture container frame 610C including the waterproof plastic tube 510 or a force for sinking the aquaculture container frame 610C including the waterproof plastic tube 510 is improved. Therefore, the aquaculture container frame 610C is difficult to be inclined with respect to the water surface, and the reduction in the amount of magnetic flux passing through the coil CL included in the aquaculture container frame 610C can be inhibited, thus the reduction in the electric power transmission efficiency can be inhibited.

Although various embodiments are described above with reference to the drawings, it is needless to say that the present disclosure is not limited to such examples. It will be apparent to those skilled in the art that various changes and modifications can be conceived within the scope of the claims, and it should be understood that such changes and modifications also belong to the technical scope of the present disclosure. Constituent elements in the above-described embodiments may be arbitrarily combined within a range not departing from the spirit of the invention.

A first aspect of the present disclosure is an electric power transmission device which is configured to transmit electric power to an electric power reception device including an electric power reception coil in water. The electric power transmission device includes: one or more transmission coils which include an electric power transmission coil configured to transmit the electric power to the electric power reception coil via a magnetic field; an electric power transmitter, configured to transmit AC power to the electric power transmission coil; a capacitor which is connected to the transmission coil and forms a resonance circuit which resonates with the transmission coil; a first tubular member which is waterproof and seals a periphery of the transmission coil; a second tubular member which surrounds the first tubular member and includes a plurality of holes; and an adjuster, configured to adjust an amount of air in a gap between the first tubular member and the second tubular member.

Here, the first tubular member may seal a periphery of a transmission coil arranged at a position closest to a water surface among the transmission coils arranged side by side in a water depth direction.

The plurality of holes of the second tubular member may be disposed dispersedly along a direction in which the second tubular member extends.

A second aspect of the present disclosure is an electric power transmission device which is configured to transmit electric power to an electric power reception device including an electric power reception coil in water. The electric power transmission device includes: one or more transmission coils which include an electric power transmission coil configured to transmit the electric power to the electric power reception coil via a magnetic field; an electric power transmitter, configured to transmit AC power to the electric power transmission coil; a capacitor which is connected to the transmission coil and forms a resonance circuit which resonates with the transmission coil; a tubular member which is waterproof and seals a periphery of the transmission coil; an accommodating body which is connected to the tubular member and accommodates air; and an adjuster, configured to adjust an amount of air accommodated in the accommodating body.

Here, the tubular member may seal a periphery of a transmission coil arranged at a position closest to a water surface among a plurality of the transmission coils arranged side by side in a water depth direction. An embodiment of the disclosure is an aquaculture container configured to farm fish in water. The aquaculture container includes: a main body portion, configured to surround fish in the water; a waterproof first tubular member, the inside of which is sealed; a second tubular member which is connected to the main body portion and surrounds the first tubular member, the second tubular member including a plurality of holes; and an adjuster, configured to adjust an amount of air in a gap between the first tubular member and the second tubular member.

The aquaculture container of the present disclosure further includes: a transmission coil, configured to transmit the electric power via a magnetic field; an electric power transmitter, configured to transmit AC power to the transmission coil; and a capacitor which is connected to the transmission coil and forms a resonance circuit which resonates with the transmission coil. The first tubular member may seal a periphery of the transmission coil.

A spacer, configured to support an outer peripheral surface of the first tubular member and an inner peripheral surface of the second tubular member, may further be provided in the gap between the first tubular member and the second tubular member.

The adjuster may include: a compressor, configured to transmit air to the gap between the first tubular member and the second tubular member; and a suction pump, configured to suction air from the gap.

The plurality of holes of the second tubular member may be disposed dispersedly along a direction in which the second tubular member extends.

An aspect of the present disclosure is an aquaculture container configured to farm fish in water. The aquaculture container includes: a main body portion, configured to surround fish in the water; a tubular member which is connected to the main body portion and is waterproof, the inside of the tubular member being sealed; an accommodating body which is connected to the tubular member and accommodates air; and an adjuster, configured to adjust an amount of air accommodated in the accommodating body.

The aquaculture container of the present disclosure further includes: a transmission coil, configured to transmit electric power via a magnetic field; an electric power transmitter, configured to transmit AC power to the transmission coil; and a capacitor which is connected to the transmission coil and forms a resonance circuit which resonates with the transmission coil. The tubular member may seal a periphery of the transmission coil.

A plurality of accommodating bodies may be provided, and the accommodating bodies may be arranged at equal intervals along the tubular member.

Three or more accommodating bodies may be provided.

The adjuster may adjust the amounts of air stored in the plurality of accommodating bodies simultaneously by the same amount.

The adjuster may include: a compressor, configured to transmit air to the accommodating body; and a suction pump, configured to suction air from the accommodating body.

The transmission coil may transmit electric power in a direction substantially orthogonal to the water surface.

The transmission coil may transmit electric power and perform data communication.

In the above embodiment, the shape of the aquaculture container cage 630 is not limited to the cylindrical shape, and may be a box shape, such as a square, a rectangle, a hexagon, or an octagon.

In the above embodiment, the aquaculture container cage 630 is connected to a lower side of the aquaculture container frame 610, 610A to 610C by a connecting rope 620, the aquaculture container cage 630 may also be connected to an upper side of the aquaculture container frame 610, 610A to 610C by the connecting rope 620. A plurality of aquaculture container cages 630 may be connected, in multiple stages, to the aquaculture container frame 610, 610A to 610C by the connecting rope 620. In this case, the aquaculture container frame 610, 610A to 610C may be arranged at any positions, such as a highest position, a lowest position, and an intermediate position of the aquaculture container cages 630 formed in the multiple stages.

In the above embodiment, it is assumed that the aquaculture container 600, 600A to 600C are installed on the sea or in the sea, and the aquaculture container 600, 600A to 600C may also be installed in a river or a lake. The aquaculture container 600, 600A to 600C may also be installed in an artificial pool or the like. Accordingly, an environment suitable for farming aquatic product can be created on land, such as a mountainous area or a sandy area.

In the above embodiment, sea water is mainly exemplified as the water, but the water may also be water other than sea water (for example, fresh water). Therefore, the coil structure body 5, 5A and the aquaculture container 600, 600A to 600C may not only have the function of floating and sinking in sea water but also have a function of floating and sinking in other water (for example, water of river, lake and dam).

The double structure plastic tube 300, in which the electric power transmission coil CLA is accommodated, is shown in the first and second embodiments, and the double structure plastic tube 300 may also be formed by covering a waterproof plastic tube accommodating the booster coil CLC with a plastic tube. In this case, an amount of air in the gap of each double structure plastic tubes 300 may be adjusted in accordance with a desired arrangement position of each coil CL (for example, different arrangement positions) in the water depth direction.

In the third and fourth embodiment, the float 410 is connected to the waterproof plastic tube 510 surrounding the electric power transmission coil CLA, and the float 410 may also be connected to a waterproof plastic tube surrounding the booster coil CLC. In this case, an amount of air stored in the float 410 may be adjusted in accordance with a desired arrangement position of each coil CL (for example, different arrangement positions) in the water depth direction.

In the above-described embodiments, a processor may be physically configured in any way. Through using a programmable processor, since processing content can be changed by changing programs, a degree of design flexibility of the processor can be improved. The processor may be configured with one semiconductor chip, or may be configured with a plurality of semiconductor chips physically. In a case where the processor is configured with a plurality of semiconductor chips, each control of the above-described embodiments may be realized by different semiconductor chips. In this case, it can be considered that one processor is configured by the plurality of semiconductor chips. The processor may be configured with the semiconductor chip and a member having a different function (such as a capacitor). One semiconductor chip may be configured to realize a function of the processor and other functions. One processor may be configured with a plurality of processors.

The present application is based on two Japanese patent applications No. 2018-060900 and 2018-060901, both filed on Mar. 27, 2018, the contents of which are incorporated by reference in this application.

INDUSTRIAL APPLICABILITY

The present disclosure is useful in an electric power transmission device which can easily change arrangement positions, in a water depth direction, of a coil configured to transmit electric power in water. The present disclosure is useful in an aquaculture container or the like which is capable of changing positions in the water depth direction.

REFERENCE SIGNS LIST

5, 5A Coil structure body
10 Electric power transmission system
20 Power supply electric wire
40 Weight
50 Watercraft
70 Submarine
80 Water bottom excavator
90 Water surface
95 Water bottom
100 Electric power transmission device
110 Power supply
120 ADC
130 CPU
140 Information communication unit
141 Modulation and demodulation circuit
150 Electric power transmission circuit
151 Driver
152 Resonance circuit
200 Electric power reception device
210 Electric power reception circuit
211 Rectifier circuit
212 Regulator
220 CPU
230 Charge control circuit
240 Secondary battery
250 Information communication unit
251 Modulation and demodulation circuit
300 Double structure plastic tube
302 Coil electric wire
310, 330, 340, 510 Waterproof plastic tube
335 Connecting rope
365 Bifurcated tube
370 Compressor
375 Valve
380 Suction pump
390 Adjuster
410, 410a to 410d Float
460, 460a to 460d Suction and discharge tube
511 Protrusion
520 Binding rope
530 Filler
600, 600A, 600B, 600C Aquaculture container
610, 610A, 610B, 610C Aquaculture container frame 620 Connecting rope
630 Aquaculture container cage
630Z Net
701 Camera
703 Light
705 Feeding device
ar Air
CL Coil
CLA Electric power transmission coil
CLB Electric power reception coil
CLC Booster coil
CA, CB and CC Capacitor
fh Fish
ow Sea water

The invention claimed is:

1. An electric power transmission device which is configured to transmit electric power to an electric power reception device, the electric power reception device including an electric power reception coil in water, the electric power transmission device comprising:
at least one transmission coil which includes an electric power transmission coil, the electric power transmission coil being configured to transmit the electric power to the electric power reception coil via a magnetic field;
an electric power transmitter, configured to transmit AC power to the electric power transmission coil;
a capacitor which is connected to the transmission coil and forms a resonance circuit which resonates with the transmission coil;
a first tubular member which is waterproof and seals a periphery of the transmission coil;
a second tubular member which surrounds the first tubular member and includes a plurality of holes; and
an adjuster, configured to adjust an amount of air in a gap between the first tubular member and the second tubular member,
wherein the adjuster includes: a compressor, configured to transmit air to the gap; and a suction pump, configured to suction the air from the gap.

2. The electric power transmission device according to claim 1, wherein the first tubular member seals a periphery of a first transmission coil arranged at a position closest to a water surface among transmission coils arranged side by side in a water depth direction.

3. The electric power transmission device according to claim 1, further comprising:
a spacer in the gap, the spacer being configured to support an outer peripheral surface of the first tubular member and an inner peripheral surface of the second tubular member.

4. The electric power transmission device according to claim 1, wherein the plurality of holes is disposed dispersedly along a direction in which the second tubular member extends.

5. The electric power transmission device according to claim 1, wherein the electric power transmission coil is configured to transmit the electric power in a direction substantially orthogonal to a water surface.

6. The electric power transmission device according to claim 1, wherein the electric power transmission coil is configured to transmit the electric power and perform data communication.

7. An electric power transmission device which is configured to transmit electric power to an electric power reception device, the electric power reception device including an electric power reception coil in water, the electric power transmission device comprising:
at least one transmission coil which includes an electric power transmission coil, the electric power transmission coil being configured to transmit electric power to the electric power reception coil via a magnetic field;
an electric power transmitter, configured to transmit AC power to the electric power transmission coil;
a capacitor which is connected to the transmission coil and forms a resonance circuit which resonates with the transmission coil;
a tubular member which is waterproof and seals a periphery of the transmission coil;
an accommodating body which is connected to the tubular member and accommodates air; and
an adjuster, configured to adjust an amount of air accommodated in the accommodating body,
wherein the adjuster includes: a compressor, configured to transmit air to the accommodating body; and a suction pump, configured to suction the air from the accommodating body.

8. The electric power transmission device according to claim 7, further comprising:
a plurality of accommodating bodies,
wherein the plurality of accommodating bodies is arranged with an equal interval along the tubular member.

9. The electric power transmission device according to claim 8, wherein three or more accommodating bodies are provided.

10. The electric power transmission device according to claim 8, wherein the adjuster adjusts amounts of air stored in the plurality of accommodating bodies simultaneously by a same amount.

11. The electric power transmission device according to claim 7, wherein the tubular member seals a periphery of a first transmission coil arranged at a position closest to a water surface among transmission coils arranged side by side in a water depth direction.

12. The electric power transmission device according to claim 7, wherein the electric power transmission coil is configured to transmit the electric power in a direction substantially orthogonal to a water surface.

13. The electric power transmission device according to claim 7, wherein the electric power transmission coil is configured to transmit the electric power and perform data communication.

14. An electric power transmission device which is configured to transmit electric power to an electric power reception device, the electric power reception device including an electric power reception coil in water, the electric power transmission device comprising:
at least one transmission coil which includes an electric power transmission coil configured to transmit the electric power to the electric power reception coil via a magnetic field;
an electric power transmitter, configured to transmit AC power to the electric power transmission coil;
a capacitor which is connected to the transmission coil and forms a resonance circuit which resonates with the transmission coil;
a first tubular member which is waterproof and seals a periphery of the transmission coil;
a second tubular member which surrounds the first tubular member and includes a plurality of holes; and
an adjuster, configured to adjust an amount of air in a gap between the first tubular member and the second tubular member, wherein the plurality of holes is disposed dispersedly along a direction in which the second tubular member extends.

* * * * *